United States Patent
Long

(10) Patent No.: US 12,185,197 B2
(45) Date of Patent: Dec. 31, 2024

(54) METHODS AND APPARATUSES FOR SMS DELIVERY

(71) Applicant: Telefonaktiebolaget LM Ericsson (publ), Stockholm (SE)

(72) Inventor: Hongxia Long, Shanghai (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 344 days.

(21) Appl. No.: 17/792,870

(22) PCT Filed: Sep. 28, 2020

(86) PCT No.: PCT/EP2020/077085
§ 371 (c)(1),
(2) Date: Jul. 14, 2022

(87) PCT Pub. No.: WO2021/160299
PCT Pub. Date: Aug. 19, 2021

(65) Prior Publication Data
US 2023/0308842 A1    Sep. 28, 2023

(30) Foreign Application Priority Data
Feb. 10, 2020  (WO) ............... PCT/CN2020/074635

(51) Int. Cl.
*H04W 4/14*    (2009.01)
*H04L 67/02*    (2022.01)

(52) U.S. Cl.
CPC .............. *H04W 4/14* (2013.01); *H04L 67/02* (2013.01)

(58) Field of Classification Search
CPC ........... H04W 4/14; H04W 8/06; H04W 8/20; H04W 88/184; H04L 67/02
See application file for complete search history.

(56) References Cited

U.S. PATENT DOCUMENTS

| 2012/0176964 A1 | 7/2012 | Cai et al. | |
| 2014/0119285 A1* | 5/2014 | Shaheen | H04W 8/04 370/328 |

(Continued)

FOREIGN PATENT DOCUMENTS

| BR | 112019006086 A2 | 9/2019 |
| CN | 108227652 A | 6/2018 |

(Continued)

OTHER PUBLICATIONS

Ericsson, "S2-1909020: Mt-SMS Delivery Reattempt in 5GC," 3GPP TSG-SA WG2 Meeting #135, Oct. 14-18, 2019, Split, Croatia, 8 pages.

(Continued)

*Primary Examiner* — Abdullahi Ahmed
(74) *Attorney, Agent, or Firm* — Withrow & Terranova, PLLC

(57) ABSTRACT

Methods and apparatuses for short message service (SMS) delivery are disclosed. According to an embodiment, a unified data management (UDM) entity maintains a short message service (SMS) waiting context for a terminal device. The SMS waiting context is information related to a re-attempt of a mobile terminating (MT) SMS delivery from at least one SMS service center (SMS-SC) to the terminal device due to a failure of the MT SMS delivery.

20 Claims, 12 Drawing Sheets

(56) References Cited

U.S. PATENT DOCUMENTS

| | | | | |
|---|---|---|---|---|
| 2020/0204962 A1* | 6/2020 | Hua | .................. | H04W 48/18 |
| 2022/0038869 A1* | 2/2022 | Avetoom | .............. | H04W 12/71 |
| 2022/0086741 A1* | 3/2022 | Liao | .................... | H04W 60/04 |
| 2022/0182923 A1* | 6/2022 | Yao | ...................... | H04W 24/10 |
| 2022/0346052 A1* | 10/2022 | Foti | ..................... | H04W 60/04 |
| 2023/0075951 A1* | 3/2023 | Long | .................... | H04L 69/40 |
| 2024/0121594 A1* | 4/2024 | Merino Vazquez | .... | H04W 4/14 |

FOREIGN PATENT DOCUMENTS

| | | |
|---|---|---|
| CN | 110582062 A | 12/2019 |
| EP | 3481139 A1 | 5/2019 |
| WO | 2014116700 A2 | 7/2014 |
| WO | 2019220750 A1 | 11/2019 |
| WO | 2020003576 A1 | 1/2020 |

OTHER PUBLICATIONS

Nokia Siemens Networks, "C4-092235: Disc About Subscriptions and Notifications," 3GPP TSG CT4 Meeting #5, Aug. 23-28, 2009, Seville, Spain, 4 pages.

Decision to Grant for Japanese Patent Application No. 2022-548099, mailed Aug. 22, 2023, 4 pages.

China Mobile, "S2-183500: Update on SMSoNAS procedures to support MT SMS domain selection," 3GPP SA WG2 Meeting #127, Apr. 16-20, 2018, Sanya, China, 9 pages.

Ericsson, "S2-184780: Deregistration procedure for SMS over NAS," 3GPP TSG-SA WG2 Meeting #127bis, May 28-Jun. 1, 2018, Newport Beach, California, 3 pages.

First Office Action for Chinese Patent Application No. 202080096034. 9, mailed Sep. 26, 2023, 7 pages.

Ericsson, "C4-203335: Support of SMSoIP," 3GPP TSG-CT WG4 Meeting #98e, Jun. 2-12, 2020, Electronic Meeting, 7 pages.

Decision to Grant for Japanese Patent Application No. 2023-143708, mailed Jul. 30, 2024, 6 pages.

Notice of Allowance for Brazilian Patent Application No. BR112022149 31-0, mailed Jun. 13, 2024, 6 pages.

Extended European Search Report for European Patent Application No. 23190171.1, mailed Jan. 22, 2024, 6 pages.

Examination Report for Indian Patent Application No. 202217037610, mailed Jun. 28, 2024, 6 pages.

Author Unknown, "Technical Specification Group Core Network and Terminals; Technical realization of the Short Message Service (SMS) (Release 15)," Technical Specification 23.040, Version 15.3. 0, Mar. 2019, 3GPP Organizational Partners, 216 pages.

Author Unknown, "Technical Specification Group Services and System Aspects; System architecture for the 5G System (5GS); Stage 2 (Release 16)," Technical Specification 23.501, Version 16.3.0, Dec. 2019, 3GPP Organizational Partners, 417 pages.

Author Unknown, "Technical Specification Group Services and System Aspects; Procedures for the 5G System; Stage 2 (Release 15)," Technical Specification 23.502, Version 15.3.0, Sep. 2018, 3GPP Organizational Partners, 330 pages.

Author Unknown, "Technical Specification Group Services and System Aspects; Procedures for the 5G System (5GS); Stage 2 (Release 16)," Technical Specification 23.502, Version 16.3.0, Dec. 2019, 3GPP Organizational Partners, 558 pages.

Author Unknown, "Technical Specification Group Core Network and Terminals; 5G System; Principles and Guidelines for Services Definition; Stage 3 (Release 16)," Technical Specification 29.501, Version 16.2.0, Dec. 2019, 3GPP Organizational Partners, 71 pages.

Author Unknown, "Technical Specification Group Core Network and Terminals; 5G System; Unified Data Repository Services; Stage 3 (Release 16)," Technical Specification 29.504, Version 16.2.0, Dec. 2019, 3GPP Organizational Partners, 37 pages.

Author Unknown, "Technical Specification Group Core Network and Terminals; 5G System; Usage of the Unified Data Repository services for Subscription Data; Stage 3 (Release 16)," Technical Specification 29.505, Version 16.1.0, Dec. 2019, 3GPP Organizational Partners, 135 pages.

Ericsson, "C4-195429: Pseudo-CR on SMS Procedures," 3GPP TSG-CT WG4 Meeting #95, Nov. 11-15, 2019, Reno, Nevada, 8 pages.

Nokia, et al., "C4-192405: Pseudo-CR on UDICOM SMS," 3GPP TSG-CT WG4 Meeting #91, May 13-17, 2019, Reno, Nevada, 5 pages.

International Search Report and Written Opinion for International Patent Application No. PCT/EP2020/077085, mailed Nov. 9, 2020, 10 pages.

International Preliminary Report on Patentability for International Patent Application No. PCT/EP2020/077085, mailed May 19, 2022, 27 pages.

\* cited by examiner

Maintain an SMS waiting context for a terminal device, wherein the SMS waiting context is information related to a re-attempt of an MT SMS delivery from at least one SMS-SC to the terminal device due to a failure of the MT SMS delivery — 602

FIG. 6

In response to being informed about a failure of the MT SMS delivery, query the UDR entity for an SMS waiting context for the terminal device — 708

When there has been no SMS waiting context stored at the UDR entity for the terminal device, create an SMS waiting context at the UDR entity for the terminal device — 710

When there has been an SMS waiting context stored at the UDR entity for the terminal device and the failure of the MT SMS delivery relates to a different SMS-SC than that of the SMS waiting context, update the SMS waiting context at the UDR entity for the terminal device — 712

FIG. 7

In response to an event indicating that the re-attempt can be started, query the UDR entity for the SMS waiting context for the terminal device — 814

Update the SMS waiting context at the UDR entity for the terminal device — 816

FIG. 8

METHODS AND APPARATUSES FOR SMS DELIVERY

This application is a 35 U.S.C. § 371 national phase filing of International Application No. PCT/EP2020/077085, filed Sep. 28, 2020, which claims the benefit of International Application No. PCT/CN2020/074635, filed Feb. 10, 2020, the disclosures of which are incorporated herein by reference in their entireties.

TECHNICAL FIELD

Embodiments of the disclosure generally relate to communication, and, more particularly, to methods and apparatuses for SMS delivery.

BACKGROUND

This section introduces aspects that may facilitate better understanding of the present disclosure. Accordingly, the statements of this section are to be read in this light and are not to be understood as admissions about what is in the prior art or what is not in the prior art.

According to section 4.4.2 of 3rd generation partnership project (3GPP) technical specification (TS) 23.501 V16.3.0, short message service (SMS) can be implemented over non-access stratum (NAS). FIG. 1 shows the non-roaming architecture to support SMS over NAS using service-based interfaces within the control plane. As shown, the architecture comprises a user equipment (UE), an access and mobility management function (AMF), an SMS function (SMSF), a unified data management (UDM), an Internet protocol (IP) short message gateway (IP-SM-GW), and an SMS gateway mobile switching center (SMS-GMSC)/interworking mobile switching center (IWMSC)/SMS router. The term Nsmsf refers to a service-based interface exhibited by the SMSF.

FIG. 2 shows the non-roaming architecture to support SMS over NAS using reference point representation. N1 is the reference point for SMS transfer between UE and AMF via NAS. The following reference points are realized by service based interfaces: N8 which is the reference point for SMS subscription data retrieval between AMF and UDM; N20 which is the reference point for SMS transfer between AMF and SMSF; and N21 which is the reference point for SMSF address registration management and SMS management subscription data retrieval between SMSF and UDM. FIG. 3 shows the roaming architecture to support SMS over NAS using service-based interfaces within the control plane. The term HPLMN refers to home public land mobile network (PLMN) and VPLMN refers to visited PLMN. FIG. 4 shows the roaming architecture to support SMS over NAS using reference point representation. Note that unified data repository (UDR) is not shown in FIGS. 1-4 for brevity.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for SMS delivery.

According to a first aspect of the disclosure, there is provided a method performed by a unified data management (UDM) entity. The method may comprise transmitting an HTTP request to a unified data repository, UDR, entity to maintain a short message service (SMS) waiting context for a terminal device, at the UDR entity. The SMS waiting context may be information related to a re-attempt of a mobile terminating (MT) SMS delivery from at least one SMS service center (SMS-SC) to the terminal device due to a failure of the MT SMS delivery.

In this way, when the re-attempt of the MT SMS delivery can be started, it can be triggered by the UDM entity since the SMS waiting context is maintained.

In an embodiment of the disclosure, the SMS waiting context may be maintained by at least one of the following steps: querying the UDR entity for an SMS waiting context for the terminal device; creating an SMS waiting context for the terminal device; and updating the SMS waiting context for the terminal device.

In an embodiment of the disclosure, the querying may be performed by sending a hypertext transfer protocol (HTTP) GET request to the UDR entity. The creating may be performed by sending an HTTP PUT request to the UDR entity. The updating may be performed by sending an HTTP PUT or PATCH request to the UDR entity.

In an embodiment of the disclosure, the HTTP PUT request may comprise the SMS waiting context for the terminal device. Alternatively or additionally, the HTTP PATCH request may comprise an indication indicating at least one of the SMS waiting context for the terminal device.

In an embodiment of the disclosure, the method may further comprise receiving an HTTP GET response in response to HTTP GET request, wherein the HTTP GET response may comprise the SMS waiting context for the terminal device.

In an embodiment of the disclosure, the method may further comprise alerting the at least one SMS-SC that the re-attempt of the MT SMS delivery can be started for the terminal device, based on the maintained SMS waiting context.

In an embodiment of the disclosure, the method may further comprise deleting the maintained SMS waiting context after alerting the at least one SMS-SC.

In an embodiment of the disclosure, the maintained SMS waiting context may be deleted from a UDR entity.

In an embodiment of the disclosure, the deleting may be performed by sending an HTTP DELETE request to the UDR entity.

In an embodiment of the disclosure, the SMS waiting context for the terminal device may contain at least one of: a list of an address of the at least one SMS-SC; a list of an expiry time of the at least one SMS-SC until which the re-attempt of the MT SMS delivery by the at least one SMS-SC is valid; a first indicator indicating that a reason for the failure of the MT SMS delivery is the terminal device being not reachable; a second indicator indicating that the reason for the failure of the MT SMS delivery is a memory capacity of the terminal device being exceeded; a third indicator indicating a reason for the re-attempt of the MT SMS delivery; a first time point until which the re-attempt of the MT SMS delivery is valid; and a second time point until which the second indicator is valid.

In an embodiment of the disclosure, the third indicator may have a first value indicating that the terminal device is reachable for the re-attempt, and/or a second value indicating that the terminal device has available memory for the re-attempt.

In an embodiment of the disclosure, maintaining the SMS waiting context at the UDR entity for the terminal device may comprise at least one of the following steps: in response to being informed about a failure of the MT SMS delivery, querying the UDR entity for an SMS waiting context for the terminal device; when there has been no SMS waiting context stored at the UDR entity for the terminal device, creating an SMS waiting context at the UDR entity for the terminal device; and when there has been an SMS waiting context stored at the UDR entity for the terminal device and the failure of the MT SMS delivery relates to a different SMS-SC than that of the SMS waiting context, updating the SMS waiting context at the UDR entity for the terminal device.

In an embodiment of the disclosure, the UDM entity may be informed that the reason for the failure of the MT SMS delivery is the terminal device being not reachable. The created or updated SMS waiting context may contain the first indicator.

In an embodiment of the disclosure, the UDM entity may be informed that the reason for the failure of the MT SMS delivery is the memory capacity of the terminal device being exceeded. The created or updated SMS waiting context may contain the second indicator.

In an embodiment of the disclosure, maintaining the SMS waiting context at the UDR entity for the terminal device may comprise, in response to an event indicating that the re-attempt can be started, querying the UDR entity for the SMS waiting context for the terminal device. Maintaining the SMS waiting context at the UDR entity for the terminal device may further comprise updating the SMS waiting context at the UDR entity for the terminal device.

In an embodiment of the disclosure, the event may be the UDM entity being informed that the terminal device is reachable. The queried SMS waiting context contains the first indicator and does not contain the second indicator. The SMS waiting context may be updated at the UDR entity by deleting the first indicator from the SMS waiting context.

In an embodiment of the disclosure, the event may be the UDM entity being informed that the terminal device has available memory for the re-attempt. The queried SMS waiting context contains the second indicator and does not contain the first indicator. The SMS waiting context may be updated at the UDR entity by deleting the second indicator from the SMS waiting context.

In an embodiment of the disclosure, the event may be the UDM entity being informed that the terminal device is reachable or has available memory for the re-attempt. The queried SMS waiting context does not contain the first indicator and the second indicator. The SMS waiting context may be updated at the UDR entity by adding the third indicator and the first time point into the SMS waiting context.

According to a second aspect of the disclosure, there is provided a method performed by a UDR entity. The method may comprise maintaining, for a terminal device, an SMS waiting context in response to an HTTP request from a UDM entity. The SMS waiting context may be information related to a re-attempt of an MT SMS delivery from at least one SMS-SC to the terminal device due to a failure of the MT SMS delivery.

In an embodiment of the disclosure, the SMS waiting context may be maintained by at least one of the following steps: responding to a query from the UDM entity for an SMS waiting context for the terminal device; creating an SMS waiting context for the terminal device; and updating the SMS waiting context for the terminal device.

In an embodiment of the disclosure, the query may be an HTTP GET request. The creating may be performed by receiving an HTTP PUT request from the UDM entity. The updating may be performed by receiving an HTTP PUT or PATCH request from the UDM entity.

In an embodiment of the disclosure, the method may further comprise deleting the maintained SMS waiting context in response to another request from the UDM entity.

In an embodiment of the disclosure, the deleting may be performed by receiving an HTTP DELETE request from the UDM entity.

In an embodiment of the disclosure, the SMS waiting context for the terminal device may contain at least one of: a list of an address of the at least one SMS-SC; a list of an expiry time of the at least one SMS-SC until which the re-attempt of the MT SMS delivery by the at least one SMS-SC is valid; a first indicator indicating that a reason for the failure of the MT SMS delivery is the terminal device being not reachable; a second indicator indicating that the reason for the failure of the MT SMS delivery is a memory capacity of the terminal device being exceeded; a third indicator indicating a reason for the re-attempt of the MT SMS delivery; a first time point until which the re-attempt of the MT SMS delivery is valid; and a second time point until which the second indicator is valid.

In an embodiment of the disclosure, the third indicator may have a first value indicating that the terminal device is reachable for the re-attempt, and/or a second value indicating that the terminal device has available memory for the re-attempt.

According to a third aspect of the disclosure, there is provided a method implemented in a communication system including a UDM entity and a UDR entity. The method may comprise transmitting an HTTP request to the UDR entity to maintain, by the UDM entity, an SMS waiting context at the UDR entity for a terminal device. The SMS waiting context may be information related to a re-attempt of a MT SMS delivery from at least one SMS-SC to the terminal device due to a failure of the MT SMS delivery. The UDR entity may maintain, for the terminal device, the SMS waiting context in response to an HTTP request from the UDM entity.

According to a fourth aspect of the disclosure, there is provided a UDM entity. The UDM entity may comprise at least one processor and at least one memory. The at least one memory may contain instructions executable by the at least one processor, whereby the UDM entity may be operative to transmit an HTTP request to the UDM entity to maintain an SMS waiting context for a terminal device, at the UDM entity. The SMS waiting context may be information related to a re-attempt of an MT SMS delivery from at least one SMS-SC to the terminal device due to a failure of the MT SMS delivery.

In an embodiment of the disclosure, the UDM entity may be operative to perform the method according to the above first aspect.

According to a fifth aspect of the disclosure, there is provided a UDR entity. The UDR entity may comprise at least one processor and at least one memory. The at least one memory may contain instructions executable by the at least one processor, whereby the UDR entity may be operative to maintain, for a terminal device, an SMS waiting context in response to an HTTP request from a UDM entity. The SMS waiting context may be information related to a re-attempt of an MT SMS delivery from at least one SMS-SC to the terminal device due to a failure of the MT SMS delivery.

In an embodiment of the disclosure, the UDR entity may be operative to perform the method according to the above second aspect.

According to a sixth aspect of the disclosure, there is provided a computer program product. The computer program product may comprise instructions which when executed by at least one processor, cause the at least one processor to perform the method according to any of the above first and second aspects.

According to a seventh aspect of the disclosure, there is provided a computer readable storage medium. The computer readable storage medium may comprise instructions which when executed by at least one processor, cause the at least one processor to perform the method according to any of the above first and second aspects.

According to an eighth aspect of the disclosure, there is provided a UDM entity. The UDM entity may comprise a transmitting module for transmitting an HTTP request to the UDR entity to maintain an SMS waiting context for a terminal device, at the UDR entity. The SMS waiting context may be information related to a re-attempt of an MT SMS delivery from at least one SMS-SC to the terminal device due to a failure of the MT SMS delivery.

According to a ninth aspect of the disclosure, there is provided a UDR entity. The UDR entity may comprise a maintaining module for maintaining, for a terminal device, an SMS waiting context in response to an HTTP request from a UDM entity. The SMS waiting context may be information related to a re-attempt of an MT SMS delivery from at least one SMS-SC to the terminal device due to a failure of the MT SMS delivery.

According to a tenth aspect of the disclosure, there is provided a communication system. The communication system may comprise a UDM entity and a UDR entity. The UDM entity may be configured to transmit an HTTP request to the UDR entity to maintain an SMS waiting context at the UDR entity for a terminal device. The SMS waiting context may be information related to a re-attempt of an MT SMS delivery from at least one SMS-SC to the terminal device due to a failure of the MT SMS delivery. The UDR entity may be configured to maintain, for the terminal device, the SMS waiting context in response to the HTTP request from the UDM entity.

BRIEF DESCRIPTION OF THE DRAWINGS

These and other objects, features and advantages of the disclosure will become apparent from the following detailed description of illustrative embodiments thereof, which are to be read in connection with the accompanying drawings.

FIG. 6 is a flowchart illustrating a method implemented at a UDM entity according to an embodiment of the disclosure;

FIG. 7 is a flowchart for explaining the method of FIG. 6;

FIG. 8 is a flowchart for explaining the method of FIG. 6;

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

According to section 4.13.3.9 of 3GPP TS 23.502 V16.3.0, the procedure of unsuccessful mobile terminating SMS delivery re-attempt is defined as follows. If the UE is registered over both 3GPP access and non-3GPP access in the same AMF (i.e. the UE is registered in the same PLMN for both access types): if the MT-SMS delivery over one Access Type has failed, the AMF, based on operator local policy, may re-attempt the MT-SMS delivery over the other Access Type before indicating failure to SMSF; and if the MT-SMS delivery on both Access Types has failed, the AMF shall inform the SMSF immediately.

If the AMF informs the SMSF that it cannot deliver the MT-SMS to the UE, the SMSF sends a failure report to the first SMS-GMSC (which can be co-located with IP-SM-GW or SMS Router) as defined in TS 23.040. If the SMS-GMSC has more than one entity for SMS transport towards the UE, then upon receiving MT-SMS failure report, the SMS-GMSC, based on operator local policy, may re-attempt the MT-SMS delivery via the other entity.

After the first SMS-GMSC informs the UDM/home subscriber server (HSS) that the UE is not able to receive MT-SMS, the UDM shall set its internal URRP-AMF flag. If the UE is registered in an AMF and the UDM has not subscribed to UE Reachability Notification in the AMF yet, the UDM immediately initiates a subscription procedure as specified in clause 4.2.5.2. When the AMF detects UE activities, it notifies UDM with UE Activity Notification as described in clause 4.2.5.3. The UDM clears its URRP-AMF flag and alerts related SCs to retry MT-SMS delivery.

When the SMS-GMSC requests routing information from UDM for a UE not registered in the 5th generation core (5GC), or for a registered UE which has not been yet registered for SMS service, the UDM responds to the SMS-GMSC that the UE is absent, stores the SC address in the MWD list (if not yet stored) and indicates that to the SC as defined in TS 23.040. The UDM also sets an internal SMSF registration notification flag to notify the SC upon subsequent SMSF registration for the UE. When the UDM receives an Nudm_UECM_Registration Request from an SMSF for a UE for which the SMSF registration notification flag is set, the UDM clears the flag and alerts the related SCs to retry the MT-SMS delivery. Note that this scenario assumes that the UE is not in 2G/3G/4G coverage.

Figure 1:
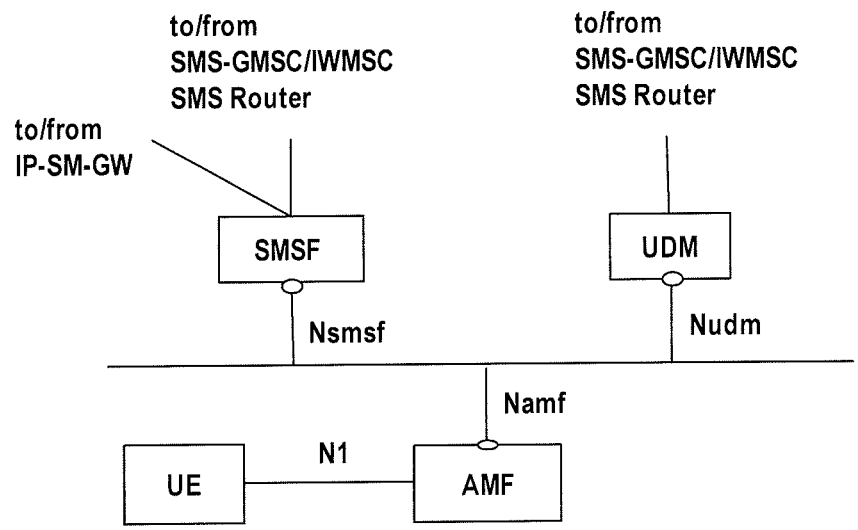
FIG. 1 is a diagram illustrating the non-roaming architecture for SMS over NAS.
Figure 2:
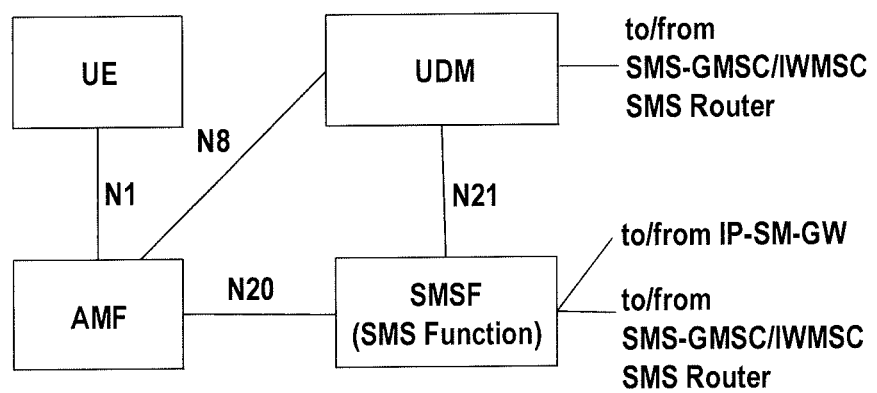
FIG. 2 is a diagram illustrating the non-roaming architecture for SMS over NAS in reference point representation.
Figure 3:
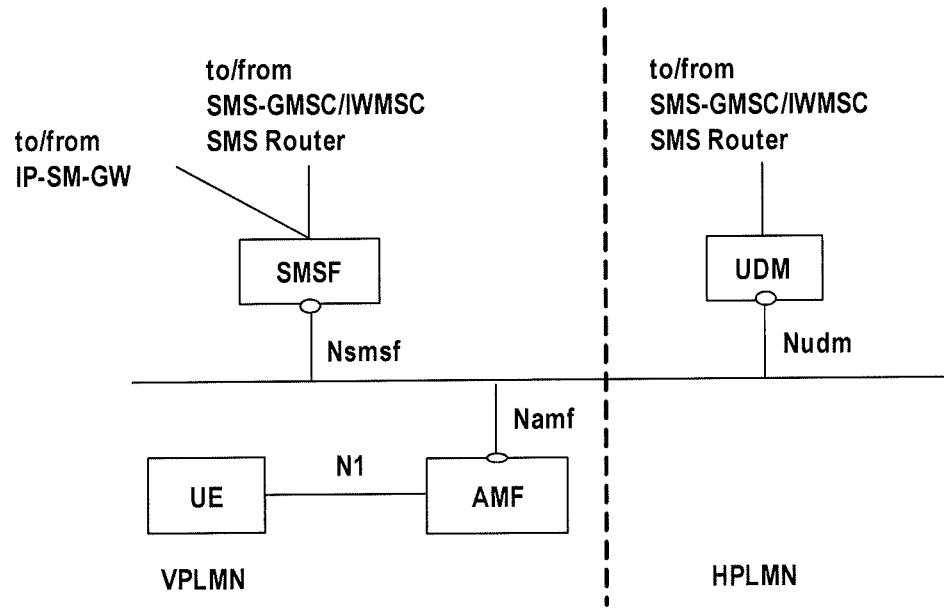
FIG. 3 is a diagram illustrating the roaming architecture for SMS over NAS.
Figure 4:
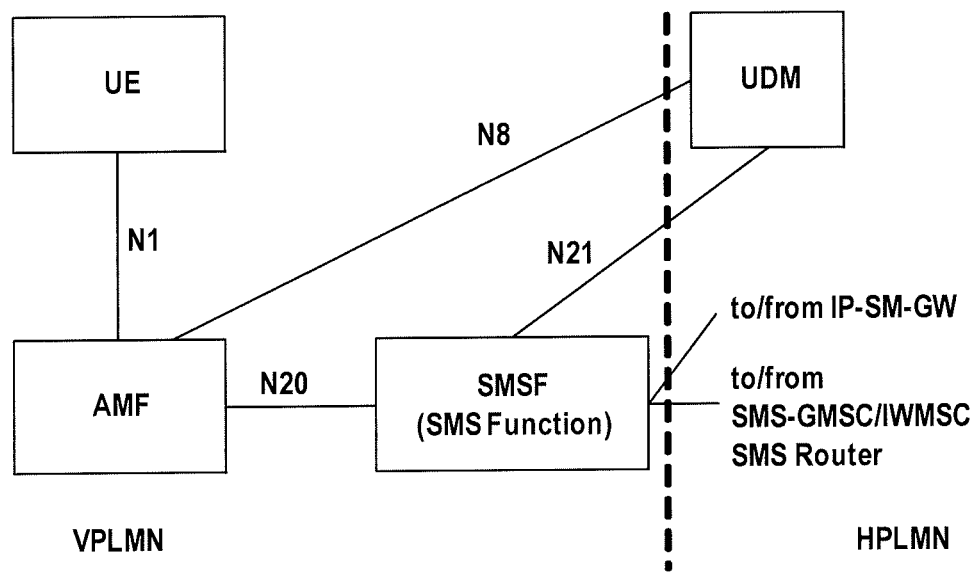
FIG. 4 is a diagram illustrating the roaming architecture for SMS over NAS in reference point representation.
Figure 5:
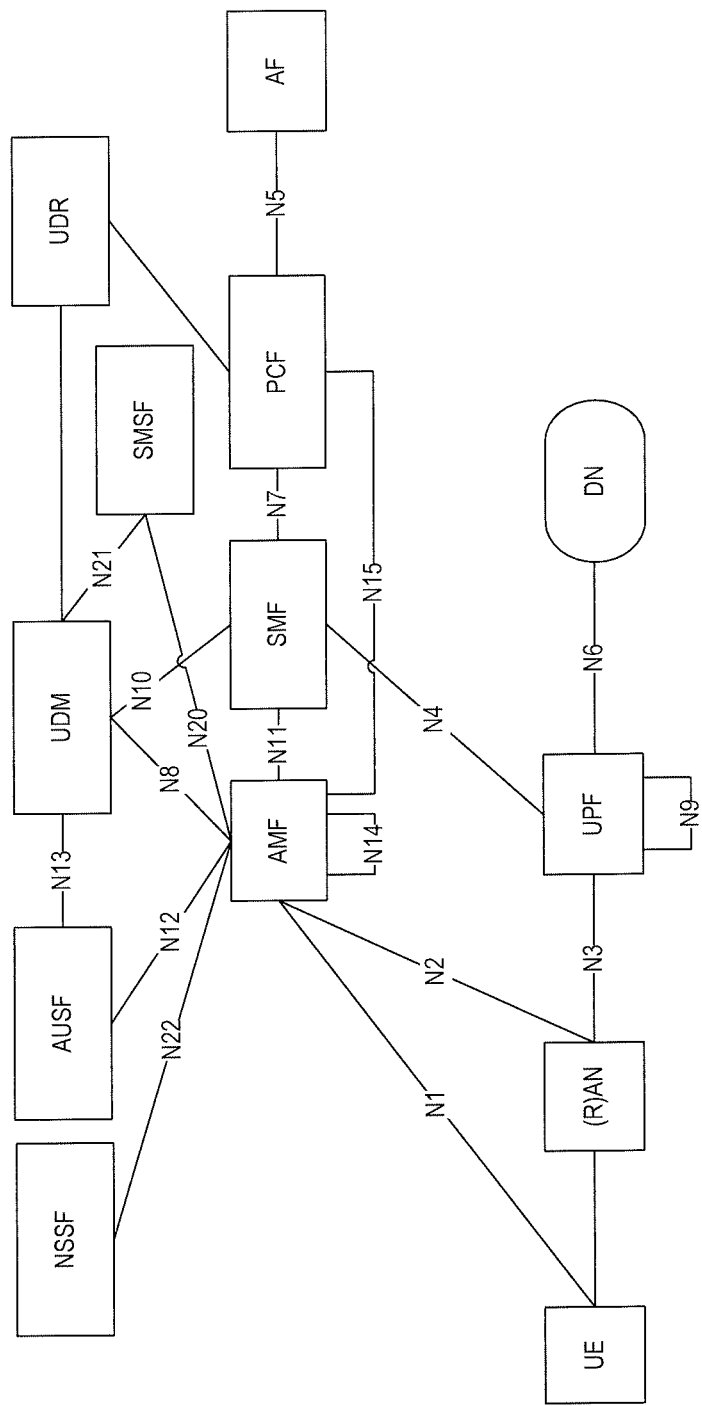
FIG. 5 is a diagram illustrating an exemplary communication system into which an embodiment of the disclosure is applicable.

With the introduction of the 5G service-based architecture (SBA) in the packet-based core network and UDR as a common back-end repository, network functions (NFs) could be implemented as stateless front-end and its needed states and context across sessions are stored in the UDR. The UDR Resource Model for Nudr application programming interface (API) is described in section 5.2.1 of 3GPP TS 29.505 V16.1.0. FIG. 5.2.1-1 and FIG. 5.2.1-2 of this technical specification show the resource uniform resource identifier (URI) sub-level structure for subscription data. Table 5.2.1-1 of this technical specification provides an overview of the resources and applicable HTTP methods.

To support unsuccessful mobile terminating SMS (MT-SMS) delivery re-attempt, UDM at one side needs to support the UE reachability event monitoring if the failure reason is UE not present or to be ready for notification if the failure reason is memory exceeding at client side. At the other side, when get notification of UE reachable event and memory available event, UDM needs to alert the SMS-SC to re-attempt the MT-SMS delivery which has failed before. Since there exists a certain period of time between the time point when the UDM knows the failure of the SMS delivery and the time point when the UDM knows the re-attempt can be started, the MT-SMS waiting context should be stored somewhere for stateless UDM to access. However, from the latest Nudr API depicted in FIG. 5.2.1-1 and FIG. 5.2.1-2 of 3GPP TS 29.505 V16.1.0, SMS waiting context data for 5G SMS service is not supported by UDR. So the unsuccessful MT-SMS delivery re-attempt does not really work in a 5GC deployment. It is even worse when it is for vertical customers who do not have legacy generation of mobile networks deployed yet.

The present disclosure proposes an improved solution for SMS delivery. Hereinafter, the solution will be described in detail with reference to FIGS. 5-18.

FIG. 5 is a diagram showing an exemplary communication system into which an embodiment of the disclosure is applicable. As shown, the communication system comprises a UE, a (radio) access network ((R)AN), a user plane function (UPF), a data network (DN), an access and mobility management function (AMF), a session management function (SMF), a policy control function (PCF), an application function (AF), a short message service function (SMSF), a network slice selection function (NSSF), an authentication server function (AUSF), a unified data management (UDM) and a unified data repository (UDR). The functional description of the above entities is specified in clause 6 of 3GPP TS 23.501 V16.3.0, which is incorporated herein by reference in its entirety.

Note that the term UE used herein may also be referred to as, for example, terminal device, access terminal, mobile station, mobile unit, subscriber station, or the like. It may refer to any end device that can access a wireless communication network and receive services therefrom. By way of example and not limitation, the UE may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a UE may represent a machine or other device that performs monitoring and/or measurements, and transmits the results of such monitoring and/or measurements to another UE and/or a network equipment. In this case, the UE may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

As used herein, the term "communication system" refers to a system following any suitable communication standards, such as the first generation (1G), 2G, 2.5G, 2.75G, 3G, 4G, 4.5G, 5G communication protocols, and/or any other protocols either currently known or to be developed in the future. Furthermore, the communications between a terminal device and a network node in the communication system may be performed according to any suitable generation communication protocols, including, but not limited to, 1G, 2G, 2.5G, 2.75G, 3G, 4G, 4.5G, 5G communication protocols, and/or any other protocols either currently known or to be developed in the future. In addition, the specific terms used herein do not limit the present disclosure only to the communication system related to the specific terms, which however can be more generally applied to other communication systems.

FIG. 6 is a flowchart illustrating a method implemented at a UDM entity according to an embodiment of the disclosure. At block 602, the UDM entity maintains an SMS waiting context for a terminal device. The SMS waiting context is information related to a re-attempt of an MT SMS delivery from at least one SMS-SC to the terminal device due to a failure of the MT SMS delivery. In this way, when the re-attempt of the MT SMS delivery can be started, it can be triggered by the UDM entity since the SMS waiting context is maintained.

For example, the SMS waiting context for the terminal device may contain, but not limited to, at least one of: a list of an address of the at least one SMS-SC; a list of an expiry time of the at least one SMS-SC until which the re-attempt of the MT SMS delivery by the at least one SMS-SC is valid; a first indicator indicating that a reason for the failure of the MT SMS delivery is the terminal device being not reachable; a second indicator indicating that the reason for the failure of the MT SMS delivery is a memory capacity of the terminal device being exceeded; a third indicator indicating a reason for the re-attempt of the MT SMS delivery; a first time point until which the re-attempt of the MT SMS delivery is valid; and a second time point until which the second indicator is valid. The third indicator may have a first value indicating that the terminal device is reachable for the re-attempt, and/or a second value indicating that the terminal device has available memory for the re-attempt.

As an option, the SMS waiting context may be maintained at a UDR entity in response to a request from the UDM entity. For example, the SMS waiting context may be maintained by interacting with the UDR entity through at least one of: querying the UDR entity for an SMS waiting context for the terminal device; creating an SMS waiting context for the terminal device; and updating the SMS waiting context for the terminal device. As an exemplary example, the querying may be performed by sending an HTTP GET request to the UDR entity. The creating may be performed by sending an HTTP PUT request to the UDR entity. The updating may be performed by sending an HTTP PUT or PATCH request to the UDR entity. As another option, it is also possible that the UDM entity has a storage component with a function similar to the UDR entity such that the SMS waiting context is maintained within the UDM entity itself.

For example, the maintaining at block 602 may be performed in response to the UDM entity being informed about a failure of the MT SMS delivery, or in response to an event indicating that the re-attempt can be started. Depending on different conditions, block 602 may be implemented as blocks 708 and 710, or blocks 708 and 712, or blocks 814 and 816. At block 708, in response to being informed about a failure of the MT SMS delivery, the UDM entity queries the UDR entity for an SMS waiting context for the terminal device. As a first example, the UDM entity may be informed that the reason for the failure of the MT SMS delivery is the terminal device being not reachable. As a second example, the UDM entity may be informed that the reason for the failure of the MT SMS delivery is the memory capacity of the terminal device being exceeded.

If there has been no SMS waiting context stored at the UDR entity for the terminal device, the UDM entity creates an SMS waiting context at the UDR entity for the terminal device at block 710. On the other hand, if there has been an SMS waiting context stored at the UDR entity for the terminal device and the failure of the MT SMS delivery relates to a different SMS-SC than that of the SMS waiting context, the UDM entity updates the SMS waiting context at the UDR entity for the terminal device at block 712. For the above first example, the created or updated SMS waiting context may contain the first indicator. For the above second example, the created or updated SMS waiting context may contain the second indicator.

At block 814, in response to an event indicating that the re-attempt can be started, the UDM entity queries the UDR entity for the SMS waiting context for the terminal device. As a third example, the event may be the UDM entity being informed that the terminal device is reachable. As a fourth example, the event may be the UDM entity being informed that the terminal device has available memory for the re-attempt. At block 816, the UDM entity updates the SMS waiting context at the UDR entity for the terminal device. For the above third example, it is possible that the queried SMS waiting context contains the first indicator and does not contain the second indicator. In this case, the SMS waiting context may be updated at the UDR entity by deleting the first indicator from the SMS waiting context. Note that the term "deleting" may refer to the first indicator being set to an opposite value when the first indicator can have two opposite values (e.g. TRUE and FALSE) to indicate opposite conditions.

For the above fourth example, it is possible that the queried SMS waiting context contains the second indicator and does not contain the first indicator. In this case, the SMS waiting context may be updated at the UDR entity by deleting the second indicator from the SMS waiting context. For the above third and fourth examples, it is also possible that the queried SMS waiting context does not contain the first indicator and the second indicator. In this case, the SMS waiting context may be updated at the UDR entity by adding the third indicator and the first time point into the SMS waiting context. The third indicator may have the first value (indicating that the terminal device is reachable for the re-attempt) for the third example, and the second value (indicating that the terminal device has available memory for the re-attempt) for the fourth example.

Figure 9:
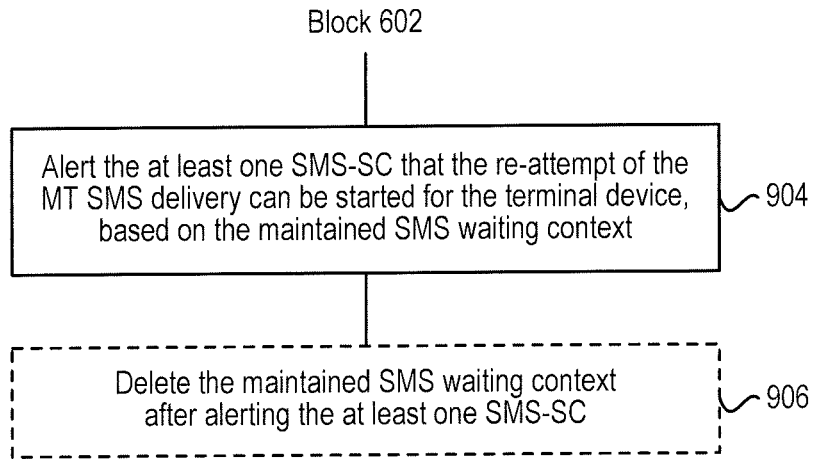
FIG. 9 is a flowchart illustrating a method implemented at a UDM entity according to an embodiment of the disclosure.

FIG. 9 is a flowchart illustrating a method implemented at a UDM entity according to an embodiment of the disclosure. As shown, the method comprises block 602, 904 and 906. Note that the dotted block may be an optional block. Block 602 has been described above and its details are omitted here. At block 904, the UDM entity alerts the at least one SMS-SC that the re-attempt of the MT SMS delivery can be started for the terminal device, based on the maintained SMS waiting context. For example, block 904 may be performed in response to the UDM entity being informed that the terminal device is reachable or the terminal device has available memory for the re-attempt. At least the list of the address of the at least one SMS-SC may be used for alerting the at least one SMS-SC. With the method comprising blocks 602 and 904, the re-attempt of the SMS delivery can be supported by the UDM entity.

Optionally, at block 906, the UDM entity deletes the maintained SMS waiting context after alerting the at least one SMS-SC. In the case where the SMS waiting context is maintained at the UDR entity, the maintained SMS waiting context may be deleted from the UDR entity. As an exemplary example, the deleting may be performed by sending an HTTP DELETE request to the UDR entity. In the case where the SMS waiting context is maintained within the UDM entity itself, the SMS waiting context may be simply deleted by the UDM entity.

Figure 10:
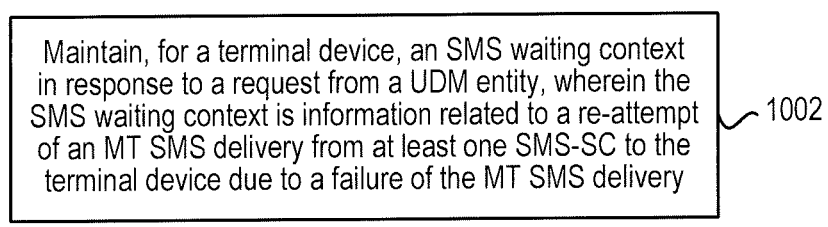
FIG. 10 is a flowchart illustrating a method implemented at a UDR entity according to an embodiment of the disclosure.

FIG. 10 is a flowchart illustrating a method implemented at a UDR entity according to an embodiment of the disclosure. At block 1002, the UDR entity maintains, for a terminal device, an SMS waiting context in response to a request from a UDM entity. The SMS waiting context is information related to a re-attempt of an MT SMS delivery from at least one SMS-SC to the terminal device due to a failure of the MT SMS delivery. With the method of FIG. 10, it is possible for the UDM entity to trigger the re-attempt of the MT SMS delivery since the SMS waiting context is maintained.

The details of the SMS waiting context have been described above and thus are omitted here. The SMS waiting context may be maintained by at least one of: responding to a query from the UDM entity for an SMS waiting context for the terminal device; creating an SMS waiting context for the terminal device; and updating the SMS waiting context for the terminal device. As an exemplary example, the query may be an HTTP GET request. The creating may be performed by receiving an HTTP PUT request from the UDM entity. The updating may be performed by receiving an HTTP PUT or PATCH request from the UDM entity.

Figure 11:
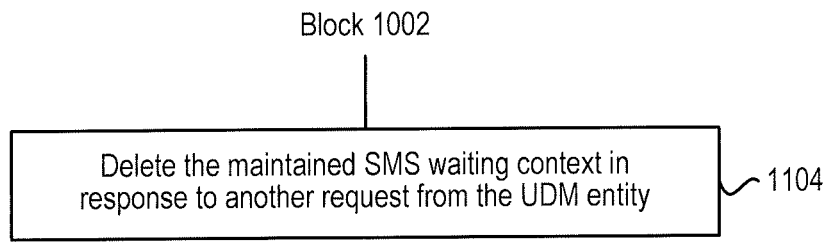
FIG. 11 is a flowchart illustrating a method implemented at a UDR entity according to an embodiment of the disclosure.

FIG. 11 is a flowchart illustrating a method implemented at a UDR entity according to an embodiment of the disclosure. As shown, the method comprises blocks 1002 and 1104. At block 1104, the UDR entity deletes the maintained SMS waiting context in response to another request from the UDM entity. As an exemplary example, the deleting may be performed by receiving an HTTP DELETE request from the UDM entity.

Based on the above, at least one aspect of the disclosure provides a method implemented in a communication system including a UDM entity and a UDR entity. The method comprises maintaining, by the UDM entity, an SMS waiting context at the UDR entity for a terminal device. The SMS waiting context is information related to a re-attempt of an MT SMS delivery from at least one SMS-SC to the terminal device due to a failure of the MT SMS delivery. The UDR entity maintains, for the terminal device, the SMS waiting context in response to a request from the UDM entity.

Correspondingly, at least one aspect of the disclosure provides a communication system comprising a UDM entity and a UDR entity. The UDM entity is configured to maintain an SMS waiting context at the UDR entity for a terminal device. The SMS waiting context is information related to a re-attempt of an MT SMS delivery from at least one SMS-SC to the terminal device due to a failure of the MT SMS delivery. The UDR entity is configured to maintain, for the terminal device, the SMS waiting context in response to a request from the UDM entity.

Figure 12:
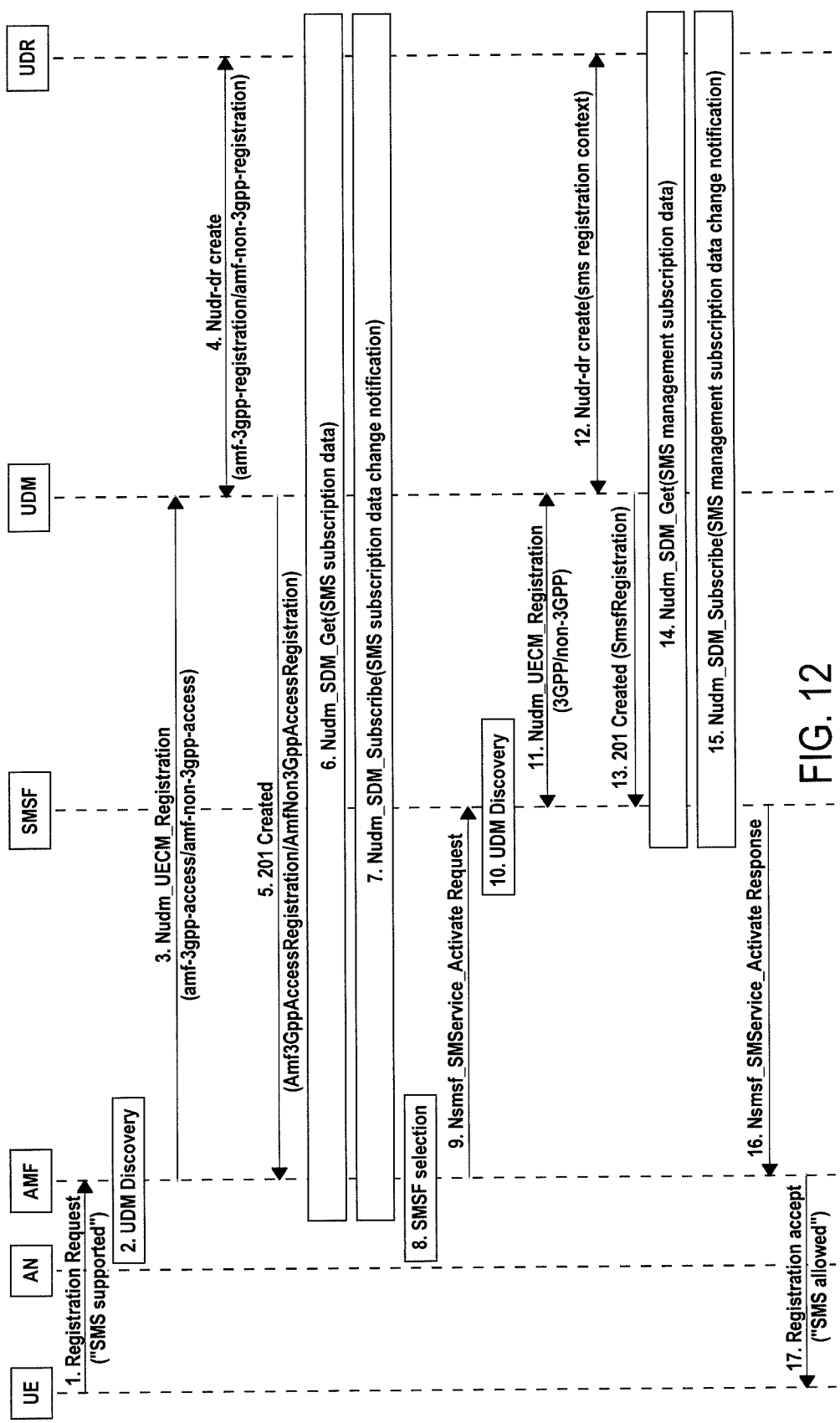
FIG. 12 is a flowchart illustrating an exemplary process of UE registration with SMS service supported.

For better understanding of the disclosure, a process of UE registration in 5G core network with SMS service supported will be described with reference to FIG. 12. As shown, this process involves a UE, an access network (AN), an AMF, an SMSF, a UDM and a UDR. Once the UE registration succeeds, then there is a registration context stored in the UDR which could be queried if there is pending MT-SMS for delivering to the UE, as depicted in step 3 of FIG. 13A and FIG. 14A.

At step 1, during 5G UE registration procedure, to enable SMS over NAS transporting, the UE includes an "SMS supported" indication in Registration Request indicating the UE's capability for SMS over NAS transporting. The "SMS supported" indication indicates whether the UE supports SMS delivery over NAS. At step 2, the AMF discovers a UDM for AMF registration. At steps 3-5, the AMF registers into the UDM either for 3GPP access or for non-3GPP access. The registration context is also stored into the UDR. At step 6, if the "SMS supported" indication is included in the Registration Request, the AMF checks SMS subscription data from the UDM for the UE on whether the SMS service is subscribed by the UE. At step 7, the AMF subscribes to data change notification for SMS subscription data.

At step 8, if SMS service is subscribed and the UE context does not include an available SMSF of the serving PLMN, the AMF discovers and selects an SMSF to serve the UE. At step 9, the AMF invokes Nsmsf_SMService_Activate service operation from the SMSF. The invocation includes AMF address, Access Type, radio access technology (RAT) type, Trace requirements, generic public subscription identifier (GPSI) (if available) and subscription permanent identifier (SUPI). The AMF uses the SMSF address derived from step 8.

At step 10, the SMSF discovers a UDM for SMSF registration. If the UE context already exists in the SMSF, the SMSF shall replace the old AMF address with the new AMF address. Otherwise, at step 11, the SMSF registers with the UDM using Nudm_UECM_Registration with Access Type (3GPP/non-3GPP). At step 12, the UDM stores the SMSF registration context into the UDR. At step 13, the UDM answers the SMSF for the SMSF registration request. At step 14, the SMSF retrieves SMS management subscription data using Nudm_SDM_Get (the UDM may get this information from the UDR by Nudr_DR_Query) and the SMSF also creates a UE context to store the SMS management subscription information and the AMF address that is serving this UE. At step 15, the SMSF subscribes to be notified when the SMS management subscription data is modified (the UDM may subscribe to notifications from the UDR by Nudr_DR_Subscribe).

At step 16, the SMSF responds back to the AMF with Nsmsf_SMService_Activate service operation response message. The AMF stores the SMSF address received as part of the UE context. At step 17, the AMF includes the "SMS allowed" indication to the UE in the Registration Accept message if the AMF has received a positive indication from the selected SMSF. The "SMS allowed" indication in the Registration Accept message indicates to the UE whether the network allows the SMS message delivery over NAS.

Figure 13A:
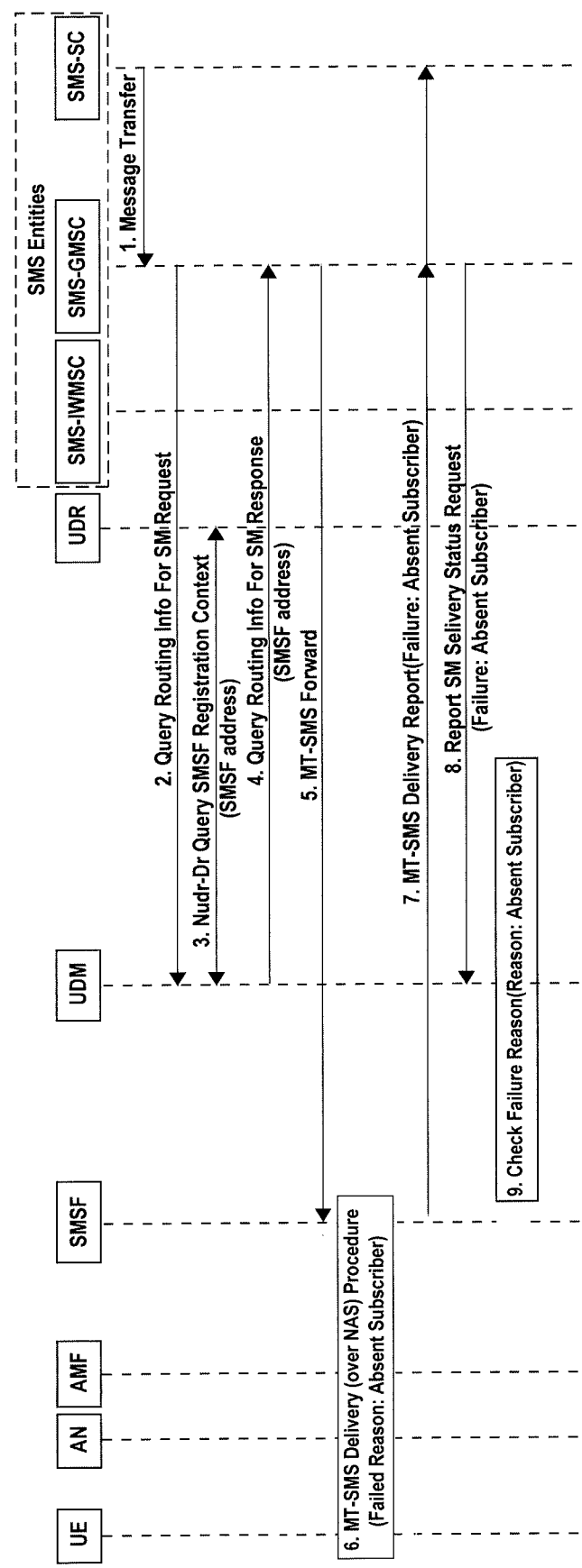
FIGS. 13A-13B are flowcharts illustrating an exemplary process according to an embodiment of the disclosure.
Figure 13B:
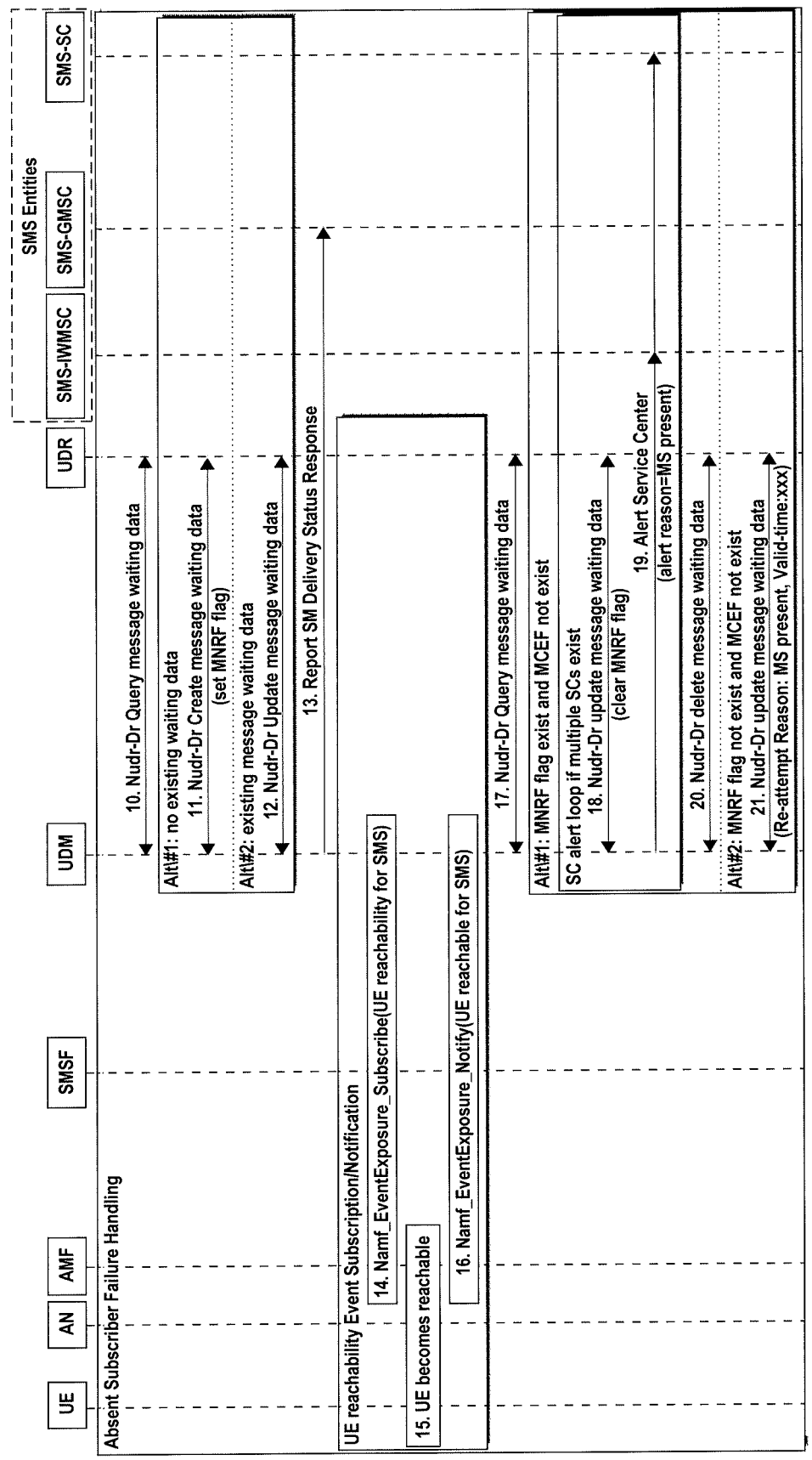

FIGS. 13A-13B illustrate an exemplary process according to an embodiment of the disclosure. It corresponds to a use case for MT-SMS re-attempt after a failure of absent subscriber. As shown, the process involves a UE, an AN, an AMF, an SMSF, a UDM, a UDR, an SMS-IWMSC, an SMS-GMSC and an SMS-SC. At step 1, the SMS-SC has pending SMS to be sent to a target UE, so it sends the message to an SMS entity SMS-GMSC. At step 2, the SMS-GMSC queries the current SMS serving node for the target UE (the identity thereof could be MSISDN or IMSI) from the UDM. In 5G domain, the serving SMS node is an SMSF. The UE registration procedure in 5G has been described above with reference to FIG. 12. At step 3, the UDM queries the current SMS serving node for the target UE from the UDR. Suppose the UE has registered before into 5G domain. Then, an SMSF address is returned by the UDR. At step 4, the UDM answers the SMS entity SMS-GMSC of the serving SMSF address for the target UE. At step 5, the SMS-GMSC forwards the MT-SMS to the SMSF address get in step 4.

At step 6, the SMSF executes the MT-SMS over NAS delivery procedure, which may further trigger UE paging if the UE is not in connected state. The delivery may succeed or fail depends on the UE connectivity state in the network or the memory state on the UE. In this process, suppose the SMS delivery fails because the UE is absent in the network. Then, at step 7, the SMSF forwards an MT-SMS delivery report to the SMS-GSMC and the SMS-SC. The failure indicator indicates a failure reason of Absent Subscriber. At step 8, the SMS-GMSC reports the MT-SMS delivery status to the UDM. The failure reason included in the message is Absent Subscriber. At step 9, the UDM checks the failure reason, then based on the failure of Absent Subscriber, starts the Absent Subscriber Failure Handling.

At step 10, the UDM queries the UDR whether there is an existing SMS waiting context for the target UE. Because this is not supported by the UDR in the prior art, this message is based on our proposed new GET method. If there is not any SMS waiting context existed before, the UDM creates and stores the SMS waiting context for the UE in the UDR at step 11. Because this is not supported by the UDR in the prior art, this message is based on our proposed new PUT method. In the message body, a mobile not reachable flag (MNRF) is set to true to indicate the failure reason of Absent Subscriber. On the other hand, if there is an existing SMS waiting context before for the same failure reason, the UDM checks whether this is for a new SMS-SC address. If this is a failure for a new SMS-SC address, then the UDM updates the SMS waiting context for the target UE at step 12 by adding the new SMS-SC address. Because this is not supported by the UDR in the prior art, this message is based on our proposed new PATCH method for delta update or based on our proposed new PUT method for full update. At step 13, the UDM answers the SMS-GMSC for the report SM delivery status request at step 8.

If UE reachability for SMS event has not been subscribed before, the UDM subscribes the UE reachability for SMS event from the AMF based on its exposed interfaces Namf_EventExposure_Subscribe at step 14. Sometime later, the UE becomes reachable again for SMS at step 15, for example within a good coverage area. At step 16, once detecting that the UE is reachable for SMS, the AMF notifies the UDM this reachable for SMS event by Namf_EventExposure_Notify.

At step 17, the UDM queries the UDR for the SMS waiting context of the target UE. Because this is not supported by the UDR in the prior art, this message is based on our proposed new GET method. If the MNRF is true and memory capacity exceeding flag (MCEF) is false, then the UDM updates the SMS waiting context stored in the UDR to set the MNRF flag to false at step 18. Because this is not supported by the UDR in the prior art, this message is based on our proposed new PATCH method for delta update or based on our proposed new PUT method for full update. For each SMS-SC address stored in the SMS waiting context, the UDM sends the alert service center message to the SMS-SC through the SMS-IWMSC at step 19, with an alert reason to indicate a desired SMS delivery re-attempt because of MS present. Once receiving the alert message, the SMS-SC could trigger the SMS redelivery procedure. If all alert service center messages have been sent, then the UDM deletes the message waiting context for the target UE from the UDR at step 20. Because this is not supported by the UDR in the prior art, this message is based on our proposed new DELETE method.

If the MNRF is false and MCEF is false, then the UDM updates the SMS waiting context stored in the UDR at step 21. The update is on the re-attempt reason as MS present and the valid time for the re-attempt. Because this is not supported by the UDR in the prior art, this message is based on our proposed new PATCH method for delta update or based on our proposed new PUT method for full update.

Figure 14A:
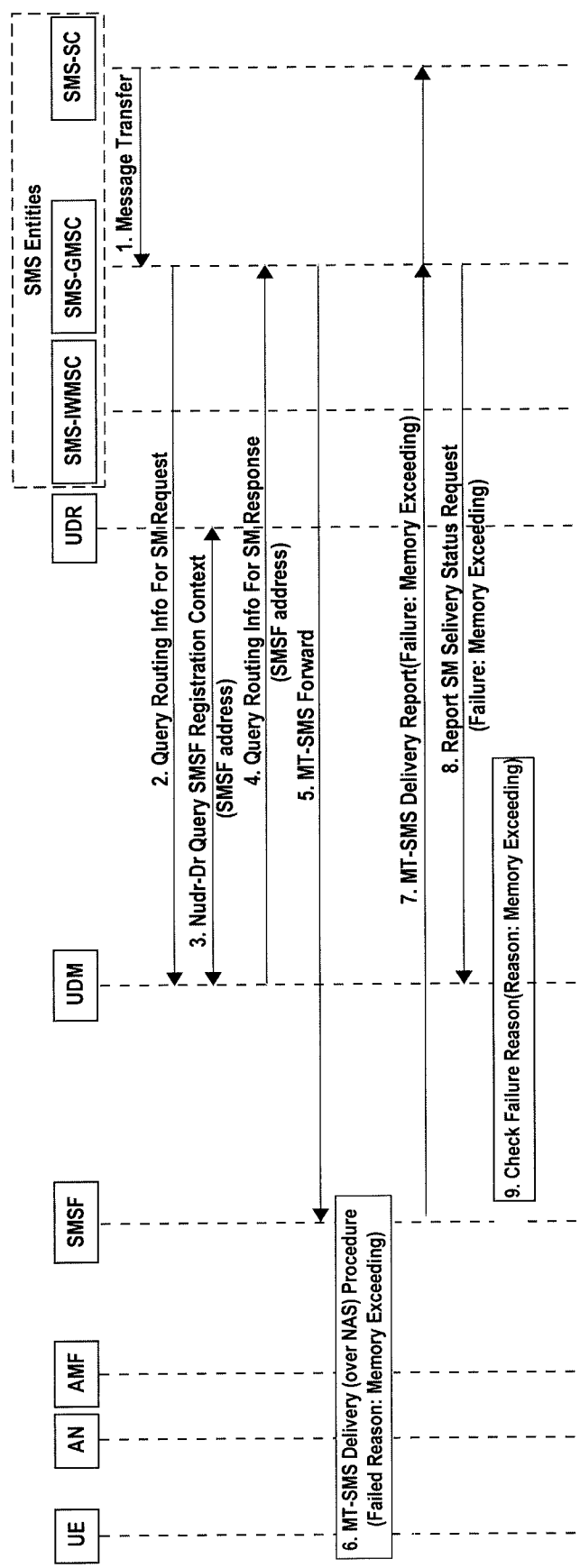
FIGS. 14A-14B are flowcharts illustrating an exemplary process according to an embodiment of the disclosure.
Figure 14B:
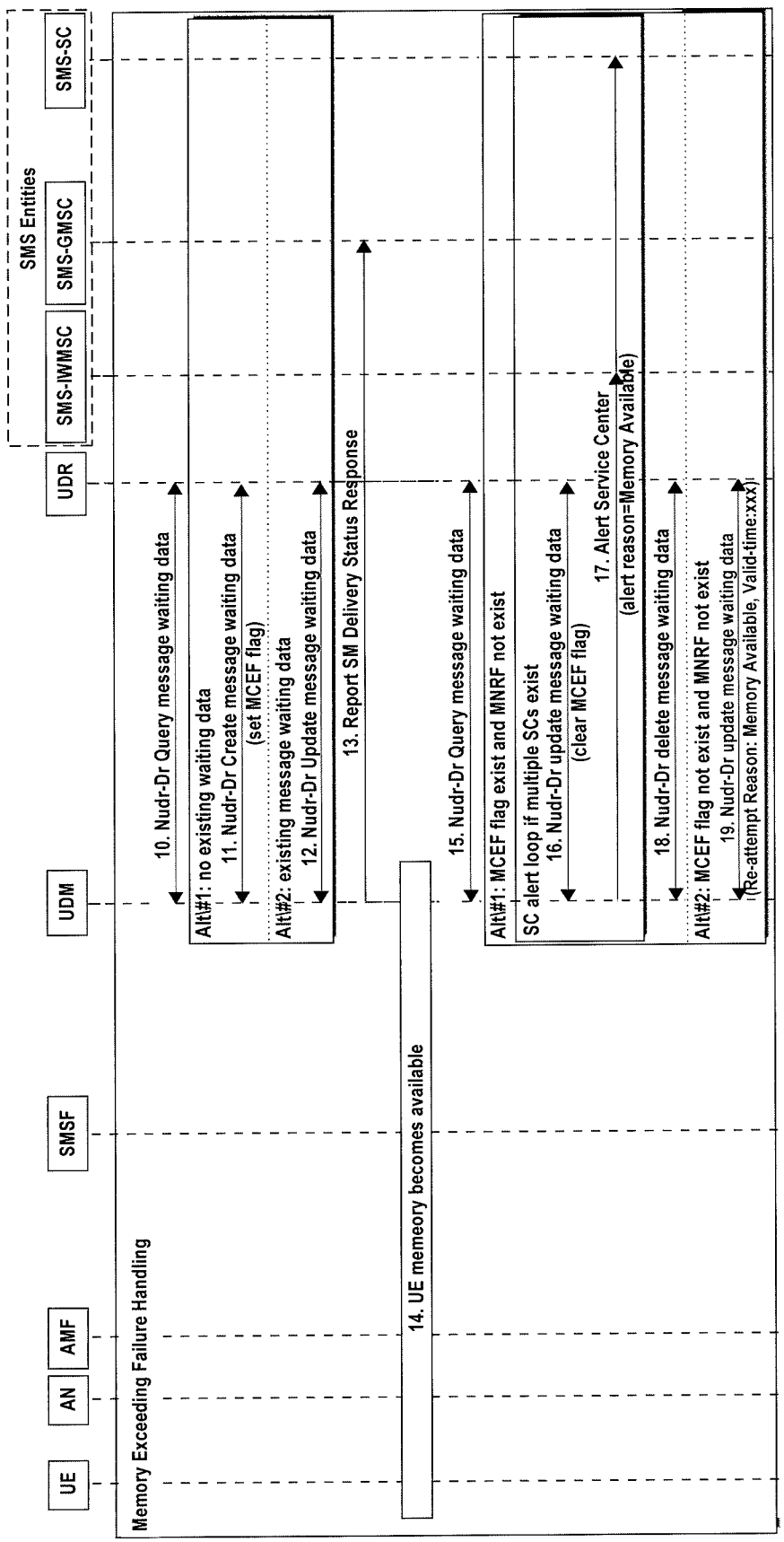

FIGS. 14A-14B illustrate an exemplary process according to an embodiment of the disclosure. It corresponds to a use case for MT-SMS re-attempt after a failure of memory exceeding. Similar to FIGS. 13A-13B, the process involves a UE, an AN, an AMF, an SMSF, a UDM, a UDR, an SMS-IWMSC, an SMS-GMSC and an SMS-SC. At step 1, the SMS-SC has pending SMS to be sent to a target UE, so it sends the message to an SMS entity SMS-GMSC. At step 2, the SMS-GMSC queries the current SMS serving node for the target UE (the identity thereof could be MSISDN or IMSI) from the UDM. In 5G domain, the serving SMS node is an SMSF. The UE registration procedure in 5G has been described above with reference to FIG. 12. At step 3, the UDM queries the current SMS serving node for the target UE from the UDR. Suppose the UE has registered before into 5G domain. Then, an SMSF address is returned by the UDR. At step 4, the UDM answers the SMS entity SMS-GMSC of the serving SMSF address for the target UE. At step 5, the SMS-GMSC forwards the MT-SMS to the SMSF address get in step 4.

At step 6, the SMSF executes the MT-SMS over NAS delivery procedure, which may further trigger UE paging if the UE is not in connected state. The delivery may succeed or fail depends on the UE connectivity state in the network or the memory state on the UE. In this process, suppose the SMS delivery fails because the UE's memory capacity is exceeded. Then, at step 7, the SMSF forwards an MT-SMS delivery report to the SMS-GSMC and the SMS-SC. The failure indicator indicates a failure reason of Memory Exceeding. At step 8, the SMS-GMSC reports the MT-SMS delivery status to the UDM. The failure reason included in the message is Memory Exceeding. At step 9, the UDM checks the failure reason, then based on the failure of Memory Exceeding, starts the Memory Exceeding Failure Handling.

At step 10, the UDM queries the UDR whether there is an existing SMS waiting context for the target UE. Because this is not supported by the UDR in the prior art, this message is based on our proposed new GET method. If there is not any SMS waiting context existed before, the UDM creates and stores the SMS waiting context for the UE in the UDR at step 11. Because this is not supported by the UDR in the prior art, this message is based on our proposed new PUT method. In the message body, a mobile memory exceeding flag (MCEF) is set to true to indicate the failure reason of Memory Exceeding. On the other hand, if there is an existing SMS waiting context before for the same failure reason, the UDM checks whether this is for a new SMS-SC address. If this is a failure for a new SMS-SC address, then the UDM updates the SMS waiting context for the target UE at step 12 by adding the new SMS-SC address. Because this is not supported by the UDR in the prior art, this message is based on our proposed new PATCH method for delta update or based on our proposed new PUT method for full update. At step 13, the UDM answers the SMS-GMSC for the report SM delivery status request at step 8.

Sometime later, the UE memory becomes available again for SMS at step 14, for example more memory is freed on the UE, and this state is reported to the network by the UE. At step 15, the UDM queries the UDR for the SMS waiting context of the target UE. Because this is not supported by the UDR in the prior art, this message is based on our proposed new GET method. If the MCEF is true and MNRF is false, then the UDM updates the SMS waiting context stored in the UDR to set the MCEF flag to false at step 16. Because this is not supported by the UDR in the prior art, this message is based on our proposed new PATCH method for delta update or based on our proposed new PUT method for full update. For each SMS-SC address stored in the SMS waiting context, the UDM sends the alert service center message to the SMS-SC through the SMS-IWMSC, with an alert reason to indicate a desired re-attempt because of UE memory available. Once receiving the alert message, the SMS-SC could trigger the SMS redelivery procedure. If all alert service center messages have been sent, then the UDM deletes the message waiting data for the target UE from the UDR at step 18. Because this is not supported by the UDR in the prior art, this message is based on our proposed new DELETE method.

If the MCEF is false and MNRF is false, then the UDM updates the SMS waiting context stored in the UDR at step 19. The update is on the re-attempt reason as memory available and the valid time for the re-attempt. Because this is not supported by the UDR in the prior art, this message is based on our proposed new PATCH method for delta update or based on our proposed new PUT method for full update.

According to the above exemplary processes, to solve the problem in the prior art that SMS waiting context data for 5G SMS service re-attempt use cases is not supported by UDR, a novel method is introduced between UDM and UDR to manage the SMS waiting context for re-attempt. Thereby, with the help of the new method, the unsuccessful MT-SMS delivery re-attempt could be really supported in a 5GC deployment.

Figure 15:
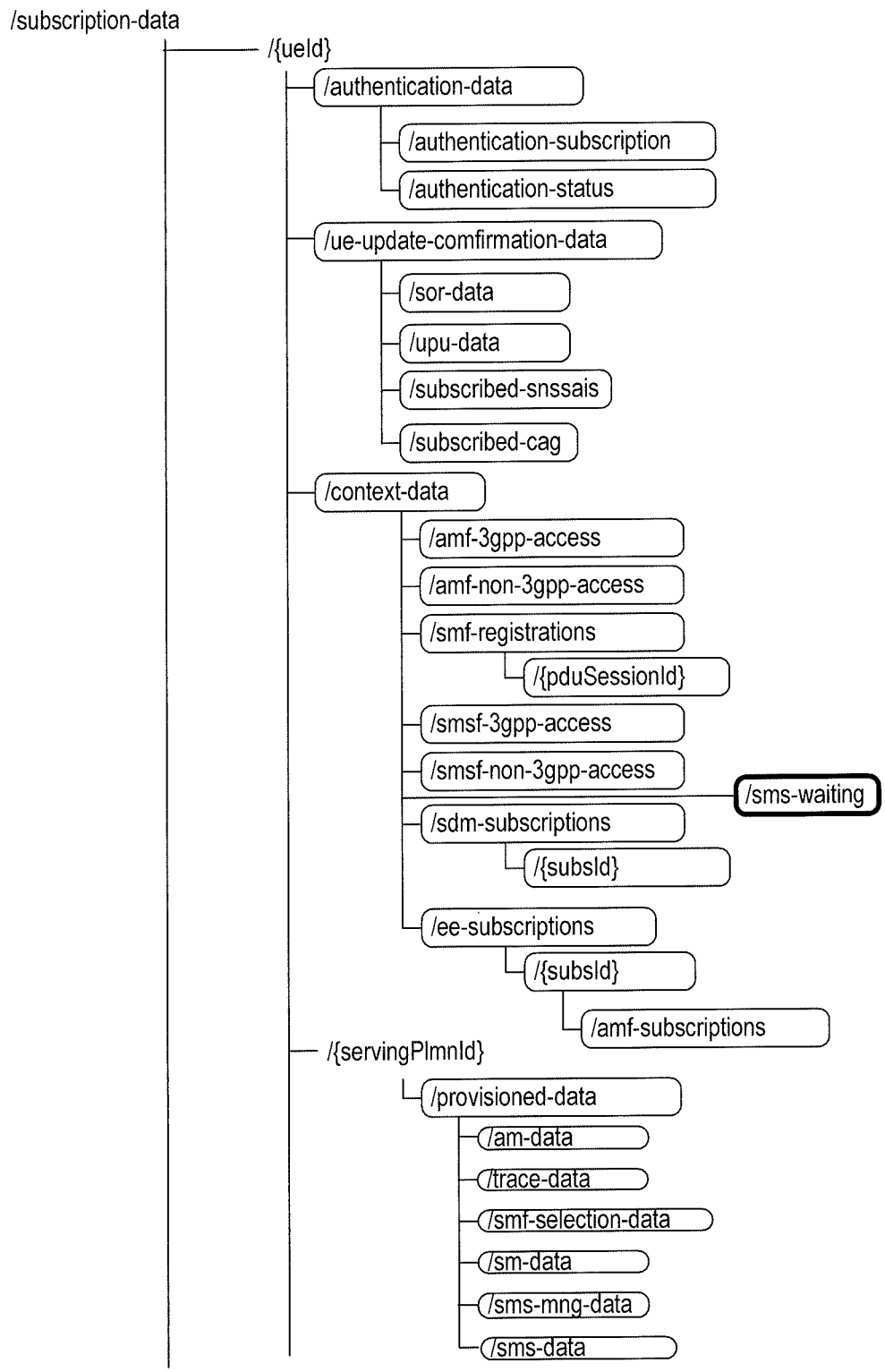
FIG. 15 is a diagram illustrating the structure for subscription data according to an embodiment of the disclosure.

Based on the above description, the following changes are proposed to be made to the current technical specifications. Firstly, a new UDR interface and corresponding resources are proposed for management of the MT-SMS waiting context for re-attempt. FIG. 15 shows this proposal for the new UDR interface for MT-SMS waiting context. As shown, the resource URI sub-level structure for subscription data is updated with "/sms-waiting" under "/context-data", compared to FIG. 5.2.1-1 of 3GPP TS 29.505 V16.1.0. This update is highlighted by a box drawn with thick lines.

The following Table 1 shows the proposal for UDR Resources and methods overview. The updates are underlined compared to Table 5.2.1-1 of 3GPP TS 29.505 V16.1.0.

TABLE 1

Resources and methods overview (added with SmsWaitingContext resource compared to Table 5.2.1-1 of 3GPP TS 29.505 V16.1.0)

| Resource name | Resource URI | HTTP method | Description |
| --- | --- | --- | --- |
| AuthenticationSubscription | /subscription-data/{ueId}/authentication-data/authentication-subscription | GET | Retrieve a UE's authentication subscription data |
|  |  | PATCH | Update a UE's authentication subscription data Updates shall be limited to the sequenceNumber attribute. Attempts to patch any other attribute shall be rejected by the UDR. |
| AuthenticationSoR | /subscription-data/{ueId}/ue-update-confirmation-data/sor-data | PUT | Store UE's SOR acknowledgement information (SoR-XMAC-IUE) |
|  |  | GET | Retrieve UE's SoR acknowledgement information |
| AuthenticationUPU | /subscription-data/{ueId}/ue-update-confirmation-data/upu-data | PUT | Store UE Parameter Update acknowledgement information (UPU-XMAC-IUE) |
|  |  | GET | Retrieve UE Parameter Update acknowledgement information |
| SubscribedSNSSAIs | /subscription-data/{ueId}/ue-update-confirmation-data/subscribed-snssais | PUT | Store UE-acknowledgement info for change of subscribed S-NSSAIs |
|  |  | GET | Retrieve UE-acknowledgement info for change of subscribed S-NSSAIs |
| SubscribedCAG | /subscription-data/{ueId}/ue-update-confirmation-data/subscribed-cag | PUT | Store UE-acknowledgement info for change of subscribed CAG |
|  |  | GET | Retrieve UE-acknowledgement info for change of subscribed CAG |
| AuthenticationStatus | /subscription-data/{ueId}/authentication-data/authentication-status | PUT | Store a UE's authentication status |
|  |  | GET | Retrieve a UE's authentication status |
| ProvisionedData | /subscription-data/{ueId}/{servingPlmnId}/provisioned-data | GET | Retrieve the UE's subscribed Provisioned Data |
| AccessAndMobility-SubscriptionData | /subscription-data/{ueId}/{servingPlmnId}/provisioned-data/am-data | GET | Retrieve the UE's subscribed Access and Mobility Data |
| SmfSelection-SubscriptionData | /subscription-data/{ueId}/{servingPlmnId}/provisioned-data/smf-selection-subscription-data | GET | Retrieve the UE's subscribed SMF Selection Data |
| SessionManagement-SubscriptionData | /subscription-data/{ueId}/{servingPlmnId}/provisioned-data/sm-data | GET | Retrieve the UE's subscribed SM Subscription Data |
| ContextData | /subscription-data/{ueId}/context-data | GET | Retrieve the UE's context Data |
| Amf3GppAccess-Registration | /subscription-data/{ueId}/context-data/amf-3gpp-access | PUT | Create and Update the AMF registration for 3GPP access |
|  |  | PATCH | Modify the AMF registration for 3GPP access |
|  |  | GET | Retrieve the AMF registration information for 3GPP access |

TABLE 1-continued

Resources and methods overview (added with SmsWaitingContext resource compared to Table 5.2.1-1 of 3GPP TS 29.505 V16.1.0)

| Resource name | Resource URI | HTTP method | Description |
| --- | --- | --- | --- |
| AmfNon3GppAccess-Registration | /subscription-data/{ueId}/context-data/amf-non-3gpp-access | PUT | Update the AMF registration for non 3GPP access |
| | | PATCH | Modify the AMF registration for non 3GPP access |
| | | GET | Retrieve the AMF registration information for non 3GPP access |
| SmfRegistrations | /subscription-data/{ueId}/context-data/smf-registrations | GET | Retrieve the list of the SMF registrations |
| IndividualSmfRegistration | /subscription-data/{ueId}/context-data/smf-registrations/{pduSessionId} | PUT | Store an individual SMF registration identified by PDU Session Id |
| | | DELETE | Delete an individual SMF registration |
| | | GET | Retrieve individual SMF registration |
| OperatorSpecificData | /subscription-data/{ueId}/operator-specific-data | GET | retrieve the operator specific subscription data of a UE |
| | | PATCH | modify the operator specific subscription data of a UE |
| OperatorDetermined-BarringData | /subscription-data/{ueId}/operator-determined-barring-data | GET | Retrieve the UE's Operator Determined Barring |
| SMSManagement-SubscriptionData | /subscription-data/{ueId}/{servingPlmnId}/provisioned-data/sms-mng-data | GET | Retrieve the UE's subscribed SMS management subscription data. |
| Smsf3GppAccess-Registration | /subscription-data/{ueId}/context-data/smsf-3gpp-access | PUT | Create or Update the SMSF registration |
| | | DELETE | Delete the SMSF registration for 3GPP access |
| | | GET | Retrieve the SMSF registration information |
| SmsfNon3GppAccess-Registration | /subscription-data/{ueId}/context-data/smsf-non-3gpp-access | PUT | Create or Update the SMSF registration for non 3GPP access |
| | | DELETE | Delete the SMSF registration for non 3GPP access |
| | | GET | Retrieve the SMSF registration information for non 3GPP access |
| SmsWaitingContext | /subscription-data/{ueId}/context-data/sms-waiting | PUT | Create/Update an individual MT-SMS waiting context for re-attempt |
| | | DELETE | Delete an individual MT-SMS waiting context for re-attempt |
| | | PATCH | Update an individual MT-SMS waiting context for re-attempt |
| | | GET | Retrieve an individual MT-SMS waiting context for re-attempt |
| SdmSubscriptions | /subscription-data/{ueId}/context-data/sdm-subscriptions | GET | Retrieve SDM subscriptions |
| | | POST | Create an individual SDM subscription |

TABLE 1-continued

Resources and methods overview (added with SmsWaitingContext resource compared to Table 5.2.1-1 of 3GPP TS 29.505 V16.1.0)

| Resource name | Resource URI | HTTP method | Description |
|---|---|---|---|
| IndividualSdmSubscription | /subscription-data/{ueId}/context-data/sdm-subscriptions/{subsId} | PUT | Update an individual SDM subscription |
| | | DELETE | Delete an individual SDM subscription |
| | | PATCH | Update an individual SDM Subscription |
| EeSubscriptions | /subscription-data/{ueId}/context-data/ee-subscriptions | GET | Retrieve EE subscriptions |
| | | POST | Create an EE subscription |
| IndividualEeSubscription | /subscription-data/{ueId}/context-data/ee-subscriptions/{subsId} | PUT | Update an individual EE subscription |
| | | DELETE | Delete an individual EE subscription |
| | | PATCH | Update an individual EE subscription |
| AmfSubscriptionInfo | /subscription-data/{ueId}/context-data/ee-subscriptions/{subsId}/amf-subscriptions | PUT | Store information related the a received Amf-EE-Subscription response |
| | | DELETE | Delete the Amf-EE-subscriptions |
| | | GET | Retrieve AMF-subscriptions |
| | | PATCH | Update AMF-subscriptions |
| EeProfileData | /subscription-data/{ueId}/ee-profile-data | GET | Retrieve the UE's subscribed EE profile data. |
| ProvisionedParamenterData | /subscription-data/{ueId}/pp-data | PATCH | Update of provisioned parameters. |
| | | GET | Retrieves the UE's provisioned parameters. |
| SMSSubscriptionData | /subscription-data/{ueId}/{servingPlmnId}/provisioned-data/sms-data | GET | Retrieve the UE's subscribed SMS subscription data. |
| SubscriptionData-Subscriptions | /subscription-data/subs-to-notify | GET | Retrieve existing subscriptions |
| | | POST | Create a subscription, i.e. subscribe a node to receive notification for change of data |
| | | DELETE | Deletes multiple subscriptions for a given UE. |
| IndividualSubscription-DataSubscription | /subscription-data/subs-to-notify/{subsId} | DELETE | Delete the subscription identified by {subsId}, i.e. unsubscribe a node to receive notification for change of data |
| | | PATCH | Update an individual Subscription to notification |
| EeGroupSubscriptions | /subscription-data/group-data/{ueGroupId}/ee-subscriptions | GET | Retrieve EE subscriptions for groups of UEs |
| | | POST | Create an EE subscription for groups of UEs |
| IndividualEeGroup-Subscription | /subscription-data/group-data/{ueGroupId}/ee-subscriptions/{subsId} | PUT | Update an individual EE subscription for a group of UEs |
| | | DELETE | Delete an individual EE subscription for a group of UEs |
| | | PATCH | Update an individual EE subscription for a group of UEs |

TABLE 1-continued

Resources and methods overview (added with SmsWaitingContext
resource compared to Table 5.2.1-1 of 3GPP TS 29.505 V16.1.0)

| Resource name | Resource URI | HTTP method | Description |
|---|---|---|---|
| TraceData | /subscription-data/{ueId}/ {servingPlmnId}/provisioned-data/trace-data | GET | Retrieve the UE's trace configuration data |
| IdentityData | /subscription-data/{ueId}/identity-data | GET | Retrieve identity data that corresponds to the provided ueId |
| SharedData (Collection) | /subscription-data/shared-data | GET | Retrieve shared data |
| GroupIdentifiers | /subscription-data/group-data/group-identifiers | GET | Retrieve group identifiers |
| 5GVnGroups | /subscription-data/group-data/5g-vn-groups | GET | Retrieve 5G VN Groups |
| Individual5GVnGroup | /subscription-data/group-data/5g-vn-groups/{externalGroupId} | PUT | Create a 5G VN Group |
|  |  | PATCH | Update a 5G VN Group |
|  |  | DELETE | Delete a 5G VN Group |
|  |  | GET | Retrieve a 5G VN Group |
| LcsPrivacySubscriptionData | /subscription-data/{ueId}/ {servingPlmnId}/provisioned-data/ lcs-privacy-data | GET | Retrieve the UE's subscribed LCS privacy Subscription Data |
| LcsMobileOriginated-SubscriptionData | /subscription-data/{ueId}/ {servingPlmnId}/provisioned-data/ lcs-mo-data | GET | Retrieve the UE's subscribed LCS Mobile Originated Subscription Data |
| NiddAuthorizationData | /subscription-data/{ueId}/nidd-authorization-data | GET | Retrieve the UE's NIDD Authorization Data |

Secondly, four new service operations are proposed for management of the MT-SMS waiting context for re-attempt: PUT: Create/Update an individual MT-SMS waiting context for re-attempt; DELETE: Delete an individual MT-SMS waiting context for re-attempt; PATCH: Update an individual MT-SMS waiting context for re-attempt; GET: Retrieve an individual MT-SMS waiting context for re-attempt.

With the new Nudr interface and related service operations introduced, SMS waiting context data for 5G SMS re-attempt can be supported by UDR. Thereby, stateless UDM could work as front-end NF and UDR could work as the back-end common repository to support 5G SMS over NAS service especially for the re-attempt use cases. The unsuccessful MT-SMS delivery re-attempt can be supported in a 5GC deployment, in a private deployment for the vertical customers who do not have legacy generation of mobile networks deployed yet.

Following (5.2.X) is a change request (CR) proposal for the description of SmsWaitingContext resource and the corresponding four serviceoperations, compared to the latest 3GPP TS 29.505 16.1.0 (2019-12). All the contents are new sections. The expression "5.2.X" means once accepted by 3GPP, this sub-chapter is under 5.2, but X should be decided when get published.

5.2.X Resource: SmsWaitingContext 5.2.X.1 Description

This resource represents the dynamic MT-SMS waiting data for a UE. It is created, deleted, updated, or queried by the UDM during the MT-SMS delivery procedures (see clause 4.13.3.9 of 3GPP TS 23.502 [18]).

This resource is modelled with the Document resource archetype (see clause C.1 of 3GPP TS 29.501 [7]).

5.2.X.2 Resource Definition

Resource URI: {apiRoot}/nudr-dr/<apiVersion>/subscription-data/{ueId}/context-data/sms-waiting This resource shall support the resource URI variables defined in table 5.2.X.2-1.

TABLE 5.2.X.2-1

Resource URI variables for this resource

| Name | Definition |
|---|---|
| apiRoot | See 3GPP TS 29.504 [2] clause 6.1.1 |
| ueId | Represents the Subscription Identifier SUPI or GPSI (see 3GPP TS 23.501 [4] clause 5.9.2) pattern: "^(imsi-[0-9]{5,15}}|nai-.+|msisdn-[0-9]{5,15}|extid-[^@]+@[^@]+|.+)$" |

5.2.X.3 Resource Standard Methods 5.2.X.3.1 PUT

This method shall support the URI query parameters specified in table 5.2.X.3.1-1.

TABLE 5.2.X.3.1-1

URI query parameters supported by
the GET method on this resource

| Name | Data type | P | Cardinality | Description |
|---|---|---|---|---|
| n/a | | | | |

This method shall support the request data structures specified in table 5.2.13.3.1-2 and the response data structures and response codes specified in table 5.2.13.3.1-3.

TABLE 5.2.X.3.1-2

Data structures supported by the PUT Request Body on this resource

| Data type | P | Cardinality | Description |
|---|---|---|---|
| SmsWaitingContext | M | 1 | The SMS waiting data created for a MT-SMS delivery failure which needs to be re-attempted upon UE reachable event notification or UE memory available event notification |

TABLE 5.2.X.3.1-3

Data structures supported by the PUT Response Body on this resource

| Data type | P | Cardinality | Response codes | Description |
|---|---|---|---|---|
| SmsWaitingContext | M | 1 | 201 Created | Upon success, a response body containing the created SMS waiting context shall be returned. |

NOTE:
In addition common data structures as listed in table 5.5-1 are supported.

5.2.X.3.2 DELETE

This method shall support the URI query parameters specified in table 5.2.X.3.2-1.

TABLE 5.2.X.3.2-1

URI query parameters supported by the DELETE method on this resource

| Name | Data type | P | Cardinality | Description |
|---|---|---|---|---|
| n/a | | | | |

This method shall support the request data structures specified in table 5.2.X.3.2-2 and the response data structures and response codes specified in table 5.2.X.3.2-3.

TABLE 5.2.X.3.2-2

Data structures supported by the DELETE Request Body on this resource

| Data type | P | Cardinality | Description |
|---|---|---|---|
| n/a | | | The request body shall be empty. |

TABLE 5.2.X.3.2-3

Data structures supported by the DELETE Response Body on this resource

| Data type | P | Cardinality | Response codes | Description |
|---|---|---|---|---|
| n/a | | | 204 No Content | Upon success, an empty response body shall be returned. |

NOTE:
In addition common data structures as listed in table 5.5-1 are supported.

5.2.X.3.3 PATCH

This method is used to modify the provisioned parameter data in the UDR.

This method shall support the URI query parameters specified in table 5.2.X.3.3-1.

TABLE 5.2.X.3.3-1

URI query parameters supported by the PATCH method on this resource

| Name | Data type | P | Cardinality | Description |
|---|---|---|---|---|
| supported-features | SupportedFeatures | O | 0 ... 1 | see 3GPP TS 29.500 [4] clause 6.6 |

This method shall support the request data structures specified in table 5.2.X.3.3-2 and the response data structures and response codes specified in table 5.2.X.3.3-3.

TABLE 5.2.X.3.3-2

Data structures supported by the PATCH Request Body on this resource

| Data type | P | Cardinality | Description |
|---|---|---|---|
| array(PatchItem) | M | 1 ... N | Contains the delta data to the SMS waiting context |

TABLE 5.2.X.3.3-3

Data structures supported by the PATCH Response Body on this resource

| Data type | P | Cardinality | Response codes | Description |
|---|---|---|---|---|
| n/a | | | 204 No Content | Upon successful modification there is no body in the response message. (NOTE 2) |
| PatchResult | M | 1 | 200 OK | Upon success, the execution report is returned. (NOTE 2) |

NOTE 1:
In addition common data structures as listed in table 5.5-1 are supported.
(NOTE 2):
If all the modification instructions in the PATCH request have been implemented, the UDR shall respond with 204 No Content response; if some of the modification instructions in the PATCH request have been discarded, and the NF service consumer has included in the supported-feature query parameter the "PatchReport" feature number, the UDR shall respond with PatchResult.

5.2.X.3.4 GET

This method shall support the URI query parameters specified in table 5.2.X.3.4-1.

TABLE 5.2.X.3.4-1

URI query parameters supported by the GET method on this resource

| Name | Data type | P | Cardinality | Description |
|---|---|---|---|---|
| n/a | | | | |

This method shall support the request data structures specified in table 5.2.X.3.4-2 and the response data structures and response codes specified in table 5.2.X.3.4-3.

TABLE 5.2.X.3.4-2

Data structures supported by the GET Request Body on this resource

| Data type | P | Cardinality | Description |
|---|---|---|---|
| n/a | | | |

TABLE 5.2.X.3.4-3

Data structures supported by the GET Response Body on this resource

| Data type | P | Cardinality | Response codes | Description |
|---|---|---|---|---|
| SmsWaitingContext | M | 1 | 200 OK | Upon success, a response body containing the SMS waiting context shall be returned. |

NOTE:
In addition common data structures as listed in table 5.5-1 are supported.

The data model proposed by the CR is as following:
5.4.2.X Type: SmsWaitingContext

TABLE 5.4.2.X-1

| SmsWaitingContext | | | | |
|---|---|---|---|---|
| Attribute name | Data type | P | Cardinality | Description |
| scAddressList | array(SmsScAddress) | C | 1 ... N | SMS-SC address list |
| mnrfIndicator | boolean | O | 0 ... 1 | MNRF indicator for the MT-SMS failure reason |
| mcefIndicator | boolean | O | 1 ... N | MCEF indicator for the MT-SMS failure reason |

TABLE 5.4.2.X-1-continued

| SmsWaitingContext | | | | |
|---|---|---|---|---|
| Attribute name | Data type | P | Cardinality | Description |
| reattemptReason | MtsmsReattemptReason | O | 1 . . . N | The reason for MT-SMS re-attempt |
| reattemptValidTime | DateTime | O | 0 . . . 1 | The time point until which MT-SMS re-attempt is valid |
| mcefValidTime | DateTime | O | 0 . . . 1 | The time point until which MCEF is valid |

5.4.2.Y Type: SmsScAddress

TABLE 5.4.2.Y-1

| SmsScAddress | | | | |
|---|---|---|---|---|
| Attribute name | Data type | P | Cardinality | Description |
| scAddress | E164Number | M | 0 . . . 1 | SMS-SC number address |
| expireTime | DateTime | O | 0 . . . 1 | The time point until which MT-SMS re-attempt by the SMS-SC is valid |

5.4.3.X Enumeration: MtsmsReattemptReason

TABLE 5.4.3.X-1

| Enumeration MtsmsReattemptReason | |
|---|---|
| Enumeration value | Description |
| "MS_PRESENT" | The UE is reachable for MT-SMS re-attempt |
| "MEMORY_AVAILABLE" | UE memory is available for MT-SMS re-attempt |

As 5G is based on service-based architecture (SBA) and the interface used between network functions (NFs) are based on service-based interface (SBI), the interface is modeled as open API and defined in yaml files. The following is our CR proposal for the Nudr-Dr open API delta updates:

```
/subscription-data/{ueId}/context-data/sms-waiting:
  put:
    summary: Create/Update an individual MT-SMS waiting context for re-attempt
    operationId: CreateSmsWaitingContext
    tags:
      - SMS Waiting Context (Document)
    parameters:
      - name: ueId
        in: path
        description: UE id
        required: true
        schema:
          $ref: 'TS29571_CommonData.yaml#/components/schemas/VarUeId'
    request Body:
      content:
        application/json:
          schema:
            $ref: '#/components/schemas/SmsWaitingContext'
    responses:
      '201':
        description: Expected response to a valid request
        content:
          application/json:
            schema:
              $ref: '#/components/schemas/SmsWaitingContext'
      default:
        description: Unexpected error
        content:
          application/problem+json:
            schema:
              $ref: 'TS29571_CommonData.yaml#/components/schemas/ProblemDetails'
  delete:
    summary: Delete an individual MT-SMS waiting context for re-attempt
    operationId: DeleteSmsWaitingContext
    tags:
      - SMS Waiting Context (Document)
    parameters:
      - name: ueId
        in: path
        description: UE id
        required: true
        schema:
          $ref: 'TS29571_CommonData.yaml#/components/schemas/VarUeId'
```

```
responses:
   '204':
      description: Upon success, an empty response body shall be returned
   default:
      description: Unexpected error
      content:
         application/problem+json:
            schema:
               $ref: 'TS29571_CommonData.yaml#/components/schemas/ProblemDetails'
patch:
   summary: Update an individual MT-SMS waiting context for re-attempt
   operationId: UpdateSmsWaitingContext
   tags:
      - SMS Waiting Context (Document)
   parameters:
      - name: ueId
        in: path
        description: pp data for a UE
        required: true
        schema:
           $ref: 'TS29571_CommonData.yaml#/components/schemas/VarUeId'
      - name: supported-features
        in: query
        description: Features required to be supported by the target NF
        schema:
           $ref: 'TS29571_CommonData.yaml#/components/schemas/SupportedFeatures'
   request Body:
      content:
         application/json-patch+json:
            schema:
               type: array
               items:
                  $ref: 'TS29571_CommonData.yaml#/components/schemas/PatchItem'
      required: true
   responses:
      '204':
         description: Expected response to a valid request
      '200':
         description: Expected response to a valid request
         content:
            application/json:
               schema:
                  $ref: 'TS29571_CommonData.yaml#/components/schemas/PatchResult'
      '403':
         description: modification is rejected
         content:
            application/problem+json:
               schema:
                  $ref: 'TS29571_CommonData.yaml#/components/schemas/ProblemDetails'
      default:
         description: Unexpected error
         content:
            application/problem+json:
               schema:
                  $ref: 'TS29571_CommonData.yaml#/components/schemas/ProblemDetails'
get:
   summary: Retrieve an individual MT-SMS waiting context for re-attempt
   operationId: QuerySmsWaitingContext
   tags:
      - SMS Waiting Context (Document)
   parameters:
      - name: ueId
        in: path
        description: UE id
        required: true
        schema:
           Sref: 'TS29571_CommonData.yaml#/components/schemas/VarUeId'
   responses:
      '200':
         description: Expected response to a valid request
         content:
            application/json:
               schema:
                  $ref: '#/components/schemas/SmsWaitingContext'
```

```
        default:
            description: Unexpected error
            content:
                application/problem+json:
                    schema:
                        $ref: 'TS29571_CommonData.yaml#/components/schemas/ProblemDe-
tails'
```

Figure 16:
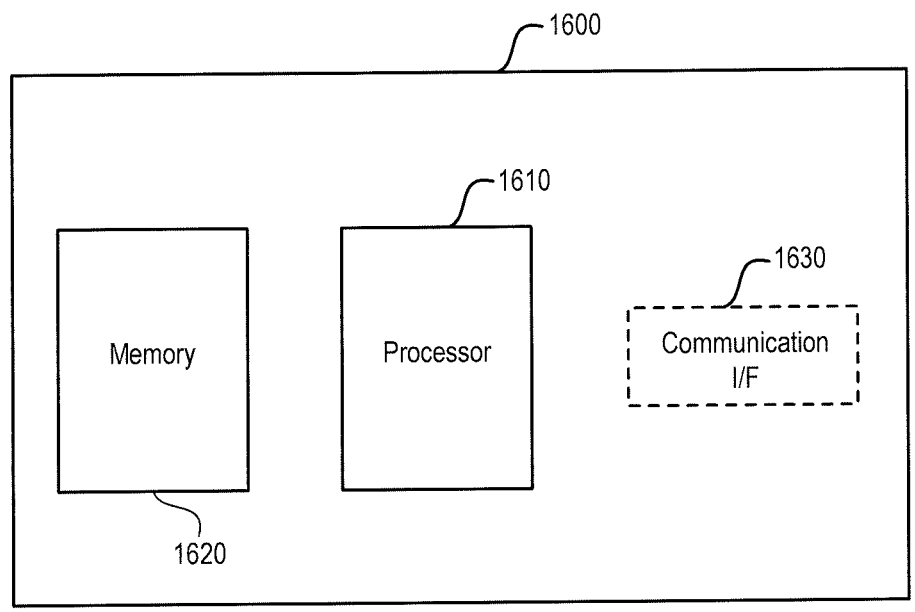
FIG. 16 is a block diagram showing an apparatus suitable for use in practicing some embodiments of the disclosure.

FIG. 16 is a block diagram showing an apparatus suitable for use in practicing some embodiments of the disclosure. For example, any one of the UDM entity and the UDR entity described above may be implemented through the apparatus 1600. As shown, the apparatus 1600 may include a processor 1610, a memory 1620 that stores a program, and optionally a communication interface 1630 for communicating data with other external devices through wired and/or wireless communication.

The program includes program instructions that, when executed by the processor 1610, enable the apparatus 1600 to operate in accordance with the embodiments of the present disclosure, as discussed above. That is, the embodiments of the present disclosure may be implemented at least in part by computer software executable by the processor 1610, or by hardware, or by a combination of software and hardware.

The memory 1620 may be of any type suitable to the local technical environment and may be implemented using any suitable data storage technology, such as semiconductor based memory devices, flash memories, magnetic memory devices and systems, optical memory devices and systems, fixed memories and removable memories. The processor 1610 may be of any type suitable to the local technical environment, and may include one or more of general purpose computers, special purpose computers, microprocessors, digital signal processors (DSPs) and processors based on multi-core processor architectures, as non-limiting examples.

Figure 17:
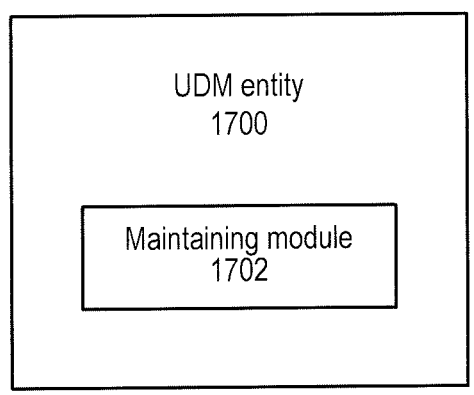
FIG. 17 is a block diagram showing a UDM entity according to an embodiment of the disclosure.

FIG. 17 is a block diagram showing a UDM entity according to an embodiment of the disclosure. As shown, the UDM entity 1700 comprises a maintaining module 1702 configured to maintain an SMS waiting context for a terminal device, as described above with respect to block 602. The SMS waiting context is information related to a re-attempt of an MT SMS delivery from at least one SMS-SC to the terminal device due to a failure of the MT SMS delivery.

Figure 18:
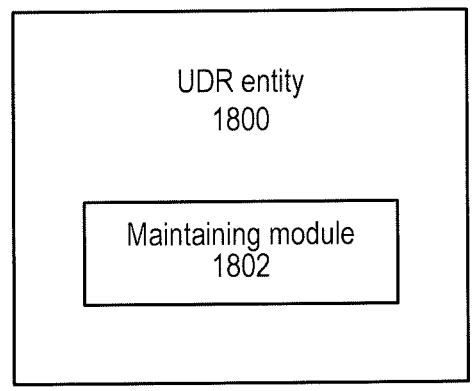
FIG. 18 is a block diagram showing a UDR entity according to an embodiment of the disclosure.

FIG. 18 is a block diagram showing a UDR entity according to an embodiment of the disclosure. As shown, the UDR entity 1800 comprises a maintaining module 1802 configured to maintain, for a terminal device, an SMS waiting context in response to a request from a UDM entity, as described above with respect to block 1002. The SMS waiting context is information related to a re-attempt of an MT SMS delivery from at least one SMS-SC to the terminal device due to a failure of the MT SMS delivery. The modules described above may be implemented by hardware, or software, or a combination of both.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one skilled in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method performed by a unified data management, UDM, entity, comprising:
    transmitting an HTTP request to unified data repository, UDR, entity to maintain a short message service, SMS, waiting context for a terminal device, at the UDR entity, wherein the SMS waiting context is information related to a re-attempt of a mobile terminating, MT, SMS delivery from at least one SMS service center, SMS-SC, to the terminal device due to a failure of the MT SMS delivery,
    wherein the SMS waiting context is maintained by at least one of the following steps:
        querying the UDR entity for an SMS waiting context for the terminal device, by sending a hypertext transfer protocol, HTTP, GET request to the UDR entity;
        creating an SMS waiting context for the terminal device, by sending an HTTP PUT request to the UDR entity; and
        updating the SMS waiting context for the terminal device, by sending an HTTP PUT or PATCH request to the UDR entity, and
    wherein the HTTP PUT request comprises the SMS waiting context for the terminal device, and/or wherein the HTTP PATCH request comprises an indication indicating at least one of the SMS waiting context for the terminal device.

2. The method of claim 1, further comprising receiving an HTTP GET response in response to HTTP GET request, wherein the HTTP GET response comprises the SMS waiting context for the terminal device.

3. The method according to claim 1, further comprising:
    alerting the at least one SMS-SC that the re-attempt of the MT SMS delivery can be started for the terminal device, based on the maintained SMS waiting context.

4. The method according to claim 3, further comprising: deleting the maintained SMS waiting context after alerting the at least one SMS-SC.

5. The method according to claim 4, wherein the maintained SMS waiting context is deleted from a UDR entity.

6. The method according to claim 3, wherein the deleting is performed by sending an HTTP DELETE request to the UDR entity.

7. The method according to claim 1, wherein the SMS waiting context for the terminal device contains at least one of:
    a list of an address of the at least one SMS-SC;
    a list of an expiry time of the at least one SMS-SC until which the re-attempt of the MT SMS delivery by the at least one SMS-SC is valid;
    a first indicator indicating that a reason for the failure of the MT SMS delivery is the terminal device being not reachable;
    a second indicator indicating that the reason for the failure of the MT SMS delivery is a memory capacity of the terminal device being exceeded;
    a third indicator indicating a reason for the re-attempt of the MT SMS delivery;
    a first time point until which the re-attempt of the MT SMS delivery is valid; and
    a second time point until which the second indicator is valid.

8. The method according to claim 7, wherein the third indicator have a first value indicating that the terminal device is reachable for the re-attempt, and/or a second value indicating that the terminal device has available memory for the re-attempt.

9. The method according to claim 7, wherein maintaining the SMS waiting context at the UDR entity for the terminal device comprises:
    in response to being informed about a failure of the MT SMS delivery, querying the UDR entity for an SMS waiting context for the terminal device;
    when there has been no SMS waiting context stored at the UDR entity for the terminal device, creating an SMS waiting context at the UDR entity for the terminal device; and
    when there has been an SMS waiting context stored at the UDR entity for the terminal device and the failure of the MT SMS delivery relates to a different SMS-SC than that of the SMS waiting context, updating the SMS waiting context at the UDR entity for the terminal device.

10. The method according to claim 9, wherein the UDM entity is informed that the reason for the failure of the MT SMS delivery is the terminal device being not reachable; and
    wherein the created or updated SMS waiting context contains the first indicator.

11. The method according to claim 9, wherein the UDM entity is informed that the reason for the failure of the MT SMS delivery is the memory capacity of the terminal device being exceeded; and
    wherein the created or updated SMS waiting context contains the second indicator.

12. The method according to claim 9, wherein maintaining the SMS waiting context at the UDR entity for the terminal device comprises:
    in response to an event indicating that the re-attempt can be started, querying the UDR entity for the SMS waiting context for the terminal device; and
    updating the SMS waiting context at the UDR entity for the terminal device.

13. The method according to claim 12, wherein the event is the UDM entity being informed that the terminal device is reachable;

wherein the queried SMS waiting context contains the first indicator and does not contain the second indicator; and wherein the SMS waiting context is updated at the UDR entity by deleting the first indicator from the SMS waiting context.

14. The method according to claim 12, wherein the event is the UDM entity being informed that the terminal device has available memory for the re-attempt;

wherein the queried SMS waiting context contains the second indicator and does not contain the first indicator; and wherein the SMS waiting context is updated at the UDR entity by deleting the second indicator from the SMS waiting context.

15. The method according to claim 12, wherein the event is the UDM entity being informed that the terminal device is reachable or has available memory for the re-attempt;

wherein the queried SMS waiting context does not contain the first indicator and the second indicator; and wherein the SMS waiting context is updated at the UDR entity by adding the third indicator and the first time point into the SMS waiting context.

16. A method performed by a unified data repository, UDR, entity, comprising:

maintaining, for a terminal device, a short message service, SMS, waiting context in response to an HTTP request from a unified data management, UDM, entity, wherein the SMS waiting context is information related to a re-attempt of a mobile terminating, MT, SMS delivery from at least one SMS service center, SMS-SC, to the terminal device due to a failure of the MT SMS delivery, wherein the SMS waiting context is maintained by at least one of the following steps:

responding to a query from the UDM entity for the SMS waiting context for the terminal device, wherein the query is a hypertext transfer protocol, HTTP, GET request;

creating the SMS waiting context for the terminal device, by receiving an HTTP PUT request from the UDM entity; and updating the SMS waiting context for the terminal device, by receiving an HTTP PUT or PATCH request from the UDM entity, and wherein the HTTP PUT request comprises the SMS waiting context for the terminal device, and/or wherein the HTTP PATCH request comprises an indication indicating at least one of the SMS waiting context for the terminal device.

17. The method according to claim 16, further comprising:

deleting the maintained SMS waiting context in response to another request from the UDM entity.

18. The method according to claim 17, wherein the deleting is performed by receiving an HTTP DELETE request from the UDM entity.

19. The method according to claim 16, wherein the SMS waiting context for the terminal device contains at least one of:

a list of an address of the at least one SMS-SC;

a list of an expiry time of the at least one SMS-SC until which the re-attempt of the MT SMS delivery by the at least one SMS-SC is valid;

a first indicator indicating that a reason for the failure of the MT SMS delivery is the terminal device being not reachable;

a second indicator indicating that the reason for the failure of the MT SMS delivery is a memory capacity of the terminal device being exceeded;

a third indicator indicating a reason for the re-attempt of the MT SMS delivery;

a first time point until which the re-attempt of the MT SMS delivery is valid; and a second time point until which the second indicator is valid.

20. The method according to claim 19, wherein the third indicator have a first value indicating that the terminal device is reachable for the re-attempt, and/or a second value indicating that the terminal device has available memory for the re-attempt.

* * * * *

UNITED STATES PATENT AND TRADEMARK OFFICE
CERTIFICATE OF CORRECTION

| | | |
|---|---|---|
| PATENT NO. | : 12,185,197 B2 | Page 1 of 1 |
| APPLICATION NO. | : 17/792870 | |
| DATED | : December 31, 2024 | |
| INVENTOR(S) | : Hongxia Long | |

It is certified that error appears in the above-identified patent and that said Letters Patent is hereby corrected as shown below:

In the Specification

In Columns 29 & 30, in Table-continued, Line 70, delete "Sref:" and insert -- $ref: --, therefor.

Signed and Sealed this
Twenty-third Day of December, 2025

John A. Squires
*Director of the United States Patent and Trademark Office*